(12) United States Patent
Miyata

(10) Patent No.: US 8,919,964 B2
(45) Date of Patent: Dec. 30, 2014

(54) LIGHT SOURCE DEVICE, APPARATUS FOR DIRECTING COOLING AIR OVER THE LIGHT SOURCE DEVICE, AND PROJECTOR

(75) Inventor: Takahiro Miyata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 320 days.

(21) Appl. No.: 13/407,071

(22) Filed: Feb. 28, 2012

(65) Prior Publication Data

US 2012/0242962 A1 Sep. 27, 2012

(30) Foreign Application Priority Data

Mar. 22, 2011 (JP) .................................. 2011-062552
Aug. 11, 2011 (JP) .................................. 2011-175943

(51) Int. Cl.
| | | |
|---|---|---|
| G03B 21/16 | (2006.01) | |
| H01J 61/52 | (2006.01) | |
| H01K 1/58 | (2006.01) | |
| F21V 29/00 | (2006.01) | |
| F21V 29/02 | (2006.01) | |

(52) U.S. Cl.
CPC .............. *F21V 29/02* (2013.01); *G03B 21/16* (2013.01)
USPC ................... 353/52; 353/57; 353/60; 353/61; 313/46; 313/423; 362/218; 362/264; 362/294; 362/345; 362/373

(58) Field of Classification Search
CPC ...... G03B 21/16; G03B 21/145; G03B 21/20; F21V 7/04; F21V 29/20; F21V 29/2293; H01J 61/025; H01J 61/52; H01J 61/523; H01J 61/526

USPC .................... 353/52, 57, 60, 61; 313/46, 423; 362/210, 264, 294, 345, 373, 218
See application file for complete search history.

(56) References Cited

U.S. PATENT DOCUMENTS

| | | | |
|---|---|---|---|
| 2008/0218050 A1* | 9/2008 | Soma et al. ...................... | 313/35 |
| 2010/0026966 A1 | 2/2010 | Nakano | |
| 2010/0091252 A1 | 4/2010 | Namba et al. | |
| 2011/0234987 A1* | 9/2011 | Tanaka et al. .................... | 353/52 |

FOREIGN PATENT DOCUMENTS

| | | |
|---|---|---|
| CN | 101639208 A | 2/2010 |
| JP | 2010-66367 A | 3/2010 |
| JP | 2010-78973 A | 4/2010 |

* cited by examiner

*Primary Examiner* — Georgia Y Epps
*Assistant Examiner* — Magda Cruz
(74) *Attorney, Agent, or Firm* — ALG Intellectual Property, LLC

(57) ABSTRACT

A light source device includes: a tubelar body disposed in the front side of a reflection mirror in the light emission direction and surrounding an arc tube; a pair of ducts connecting with the tubelar body and provided with a first channel and a second channel to guide air; and a channel switching mechanism which allows air to flow through the first channel or the second channel. The tubelar body includes a pair of communicating ports configured to supply air flowing through the first channel and the second channel toward the light emission portion. The pair of the communicating ports are disposed on a virtual line passing through the center line of the arc tube and crossing the vertical direction and the horizontal direction as viewed in a direction along the center line.

14 Claims, 19 Drawing Sheets

LIGHT SOURCE DEVICE, APPARATUS FOR DIRECTING COOLING AIR OVER THE LIGHT SOURCE DEVICE, AND PROJECTOR

CROSS-REFERENCE

The entire disclosure of Japanese Patent Application No. 2011-62552, filed Mar. 22, 2011 and No. 2011-175943, filed Aug. 11, 2011 are expressly incorporated by reference herein.

BACKGROUND

1. Technical Field

The present invention relates to a light source device and a projector.

2. Related Art

A typical projector includes a light source device which has an arc tube provided with a light emission portion where a pair of electrodes is accommodated, and a reflection mirror for reflecting light emitted from the light emission portion.

According to this type of light source device, cooling air needs to be supplied to the upper part of the light emission portion to elongate the life of the arc tube.

For satisfying this requirement, such a technology has been proposed which supplies air to the upper part of the light emission portion of the projector installed in various positions (including normal position, suspended position, upward projection position, and downward projection position) for prolongation of the life of the arc tube (for example, see JP-A-2010-78973).

According to the projector disclosed in JP-A-2010-78973, a front glass made of transparent material is provided in the front side of the reflection mirror in the light emission direction.

Besides, an air guide member is disposed between the reflection mirror and the front glass. This air guide member has a cylindrical shape surrounding the arc tube, so that air delivered from a cooling fan can flow in a direction along the circumference of the cylindrical shape of the air guide member.

The air guide member has four openings formed at upper, lower, left, and right positions on the air guide member with respect to a center line of the arc tube (optical axis of light emitted from the light source device) as viewed in the direction of the center line. The four openings of the air guide member are openings through which the air guided by the air guide member is supplied toward the upper part of the light emission portion.

The air guide member includes a plurality of valves movable by their own weights.

These plural valves guide air toward the opening located at the upper position with respect to the center line of the arc tube in accordance with the position of the projector so as to supply air toward the upper part of the arc tube through the corresponding opening.

According to this type of light source device, air heated by the light emission portion and the like needs to be discharged to the outside of the space where the arc tube is disposed (space defined by the reflection mirror, the front glass, and the air guide member) for elongation of the life of the arc tube.

For this purpose, according to the projector disclosed in JP-A-2010-78973, an air outlet port is formed in an area of the air guide member where channels for guiding air toward the respective openings are not provided, through which port the air heated by the light emission portion and the like is discharged to the outside.

However, the channels provided inside the air guide member extend substantially throughout the area of the air guide member in the circumferential direction of the cylindrical shape to guide air toward the respective openings formed at the four positions.

In this arrangement, the air guide member has only a limited space which can be opened as the air outlet port.

Accordingly, in the case of the projector disclosed in JP-A-2010-78973, the air heated by the light emission portion and the like easily remains in the space where the arc tube is disposed due to the small opening area of the air outlet port, in which condition prolongation of the life of the arc tube cannot be sufficiently achieved.

SUMMARY

An advantage of some aspects of the invention is to provide a technology capable of increasing the life of an arc tube included in a light source device and a projector.

An aspect of the invention is directed to a light source device including: an arc tube which has a light emission portion including a pair of electrodes internally; a reflection mirror configured to reflect light emitted from the light emission portion; a tubular body disposed in the front side of the reflection mirror in the light emission direction and surrounding the arc tube; a pair of ducts connecting with the tubular body and provided with a first channel and a second channel to guide air; and a channel switching mechanism which allows air to flow through the first channel or the second channel. The tubular body includes a pair of communicating ports which connect the inside and the outside of the tubular body such that the inside and the outside of the tubular body communicate with each other, and supply airs flowing through the first channel and the second channel toward the light emission portion. The pair of the communicating ports are disposed on a virtual line passing through the center line of the arc tube and crossing the vertical direction and the horizontal direction as viewed in a direction along the center line.

In the description hereinbefore and hereinafter, the phrase "front side in the light emission direction" refers to the side toward which light reflected by the reflection mirror travels. On the other hand, the phrase "rear side in the light emission direction" refers to the side opposite to the front side in the light emission direction.

According to this aspect of the invention, the tubular body has the pair of the communicating ports at the positions specified above.

In this structure, either one of the pair of the communicating ports is positioned diagonally above the center line of the arc tube as viewed from the direction along the center line in each condition of the installation positions of a projector including the light source device (normal position, ceiling mounted position, upward projection position, and downward projection position), for example.

In this case, air flows toward either one of the communicating ports positioned on the diagonally upper side via one of the pair of the ducts by the function of the channel switching mechanism to reach the upper part of the light emission portion via the corresponding communicating port.

Accordingly, supply of air toward the upper part of the light emission portion can be securely achieved in each condition of the installation positions of the projector, wherefore the life of the arc tube increases.

Moreover, the tubular body has only the two communicating ports positioned as explained above. In this case, the tubular body has a larger area which can be opened as an air outlet port than in the related-art structure.

Thus, air heated by the light emission portion and the like can be efficiently discharged from the inside of the tubular body to the outside via the air outlet port having a larger opening area, wherefore the life of the arc tube increases by reduction of air heated by the light emission portion and the like and remaining inside the tubular body.

It is preferable that the tubular body of the light source device of the above aspect includes a column-shaped main body, and hollow portions disposed within the column-shaped main body for each of the communicating ports. In this case, the communicating port includes a first communicating port formed in the column-shaped main body and connecting the outside of the tubular body and the inside of the hollow portion such that the outside of the tubular body and the inside of the hollow portion communicate with each other, and a second communicating port formed in the hollow portion and to flow an air within the hollow portion toward the light emission portion. The second communicating port is formed in a side wall of the hollow portion on the rear side in the light emission direction.

According to this structure, each of the communicating ports includes the first and second communicating ports. The second communicating port is formed in the side wall of the hollow portion on the rear side in the light emission direction. In this case, the function of rectifying the flow of air toward the upper part of the light emission portion is added to the hollow portion.

Accordingly, the rectifying function added to the hollow portion contributes to secure supply of air toward the upper part of the light emission portion, wherefore the life of the arc tube further increases.

It is preferable that rectifying members provided for each of the communicating ports of the light source device of the above aspect in such a manner as to be rotatable by the weights of the rectifying members rectify the flow of air introduced into the tubular body via the communicating ports toward the light emission portion. In this case, each of the two rectifying members has a pair of a first rectifying plate and a second rectifying plate.

According to this structure, the rectifying members are provided for each of the communicating ports.

Thus, air introduced into the tubular body via the communicating ports can be rectified by the rectifying members and efficiently supplied toward the upper part of the light emission portion.

When each of the rectifying members has only one rectifying plate, the flow rectifying effect produced by the rectifying member decreases, in which condition the air introduced into the tubular body via the communicating port is difficult to be sufficiently rectified to flow toward the upper part of the light emission portion in a preferable condition.

On the other hand, when the rectifying member has three or a larger number of rectifying plates, the rectifying effect produced by the rectifying member increases. However, the pressure loss of the air introduced into the tubular body via the communicating port increases by the existence of the rectifying member, in which case a desired amount of air is difficult to be supplied at a desired speed toward the upper part of the light emission portion.

According to the structure of this aspect of the invention, the rectifying member has a pair of the rectifying plates. In this case, increase in the rectifying effect by the rectifying member and reduction of the pressure loss of air introduced into the tubular body via the communicating port can be both achieved. Therefore, air can be supplied toward the upper part of the light emission portion in a preferable condition with the aid of a minimum number of the rectifying plates.

It is preferable that the tubular body of the light source device of the above aspect includes a column-shaped main body, and accommodating portions provided within the column-shaped main body for each of the communicating ports, each of the accommodating portions accommodating the corresponding rectifying member such that the rectifying member is rotatable by the weight of the rectifying member. In this case, each of the communicating ports includes a first communicating port formed in the column-shaped main body and connecting the outside of the tubular body and the inside of the accommodating portion such that the outside of the tubular body and the inside of the accommodating portion communicate with each other, and a second communicating port formed in the accommodating portion and to flow an air within the accommodating portion toward the light emission portion. The second communicating port is formed in a side wall of the accommodating portion on the rear side in the light emission direction.

According to this structure, each of the communicating ports includes the first and second communicating ports. The second communicating port is formed in the side wall of the accommodating portion on the rear side in the light emission direction. In this case, the accommodating portion has not only the function of accommodating the rectifying member such that the rectifying member rotate by its own weight, but also the function of rectifying the flow of air toward the upper part of the light emission portion together with the rectifying member.

Thus, the rectifying function added to the accommodating portion contributes to secure supply of air toward the upper part of the light emission portion, wherefore the life of the arc tube further increases.

It is preferable that the first rectifying plate and the second rectifying plate of the light source device of the above aspect are pivotally supported on the corresponding accommodating portion such that the ends of the first rectifying plate and the second rectifying plate on the side away from the first communicating port are rotatable around corresponding rotation axis extending in parallel with the center line. In this case, the tubular body includes rotation regulating unit configured to regulate the rotation of the first rectifying plate and the second rectifying plate. The rotation regulating unit regulates the rotations of the corresponding first and second rectifying plates such that the distance between the ends of the first and second rectifying plates on the side away from the corresponding first communicating port becomes shorter than the distance between the other ends of the first and second rectifying plates on the side nearer to the first communicating port when the first and second rectifying plates are located above the center line.

According to this structure, the tubular body includes the rotation regulating unit. In this case, the flow direction of the air rectified by the first rectifying plate and the flow direction of the air rectified by the second rectifying plate cross each other within the tubular body during supply of air into the tubular body through the first and second communicating ports.

Accordingly, the air introduced into the tubular body via the first and second communicating ports can be securely supplied toward the upper part of the light emission portion by rectification of the flow of the air with the aid of the first and second rectifying plates.

It is preferable that the pair of the ducts of the light source device of the above aspect is defined by a cover member attached to the outer surface of the tubular body and extended in the circumferential direction of the tubular body, the cover member forms the first channel and the second channel in the space between the cover member and the outer surface of the tubular body.

According to this structure, the pair of the ducts are defined by the cover member constructed as above. In this case, the first and second channels through which air flows toward the pair of the communicating ports can be produced only by attachment of the cover member to the outer surface of the tubular body. Accordingly, simplification of the structure of the light source device and size reduction of the light source device can be both achieved.

Another aspect of the invention is directed to a projector including: a light source device; a light modulation device configured to modulate light emitted from the light source device; and a projection device configured to project the light modulated by the light modulation device. The light source device of the projector is constituted by the light source device of the above aspect of the invention.

According to this aspect of the invention, the projector has the light source device constructed as above. Thus, operations and advantages similar to those of the light source device described above can be offered.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment according to the invention is hereinafter described with reference to the drawings.

Structure of Projector

Figure 1:
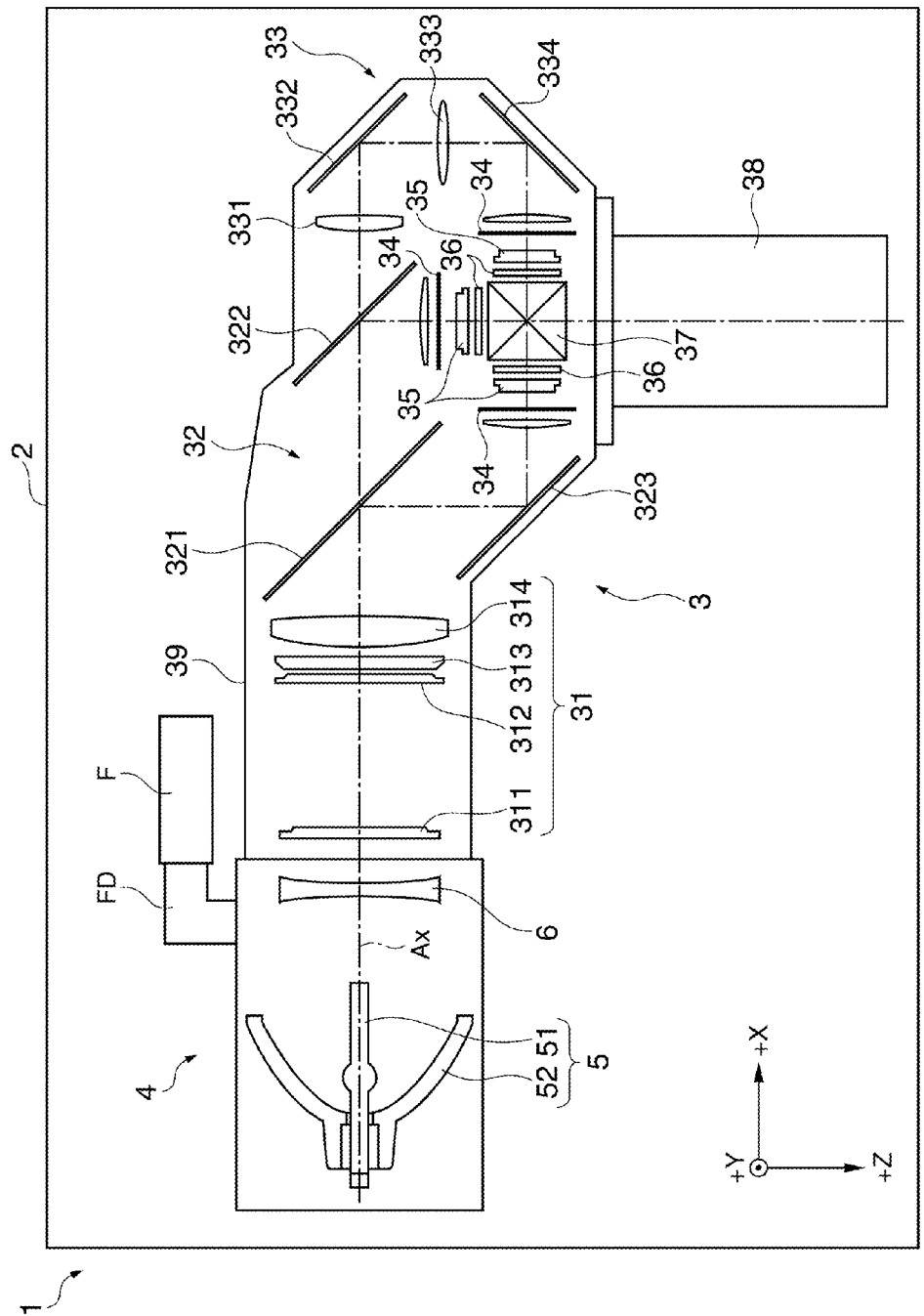
FIG. 1 is a plan view schematically illustrating the internal structure of a projector according to a first embodiment.

FIG. 1 is a plan view schematically illustrating the internal structure of a projector 1 according to the first embodiment.

In the following description, the side where a projection lens 38 (described later) is disposed (projection side) is referred to as the "front side", while the opposite side is referred to as the "rear side" for convenience of explanation.

Moreover, the direction of projection from the projection lens 38 of the projector 1 installed in the normal position (where the top and the bottom of the projector 1 are disposed at upper and lower positions, respectively) corresponds to the Z axis. The horizontal axis crossing the Z axis at right angles corresponds to the X axis. The vertical axis crossing the Z axis at right angles corresponds to the Y axis. The upper side with respect to the Y axis is referred to as the +Y axis side, while the lower side with respect to the Y axis is referred to as the −Y axis side.

The projector 1 projects an image onto a screen (not shown) for display of a projection image.

As illustrated in FIG. 1, the projector 1 includes an optical unit 3 accommodated in an external housing 2.

Structure of Optical Unit

As illustrated in FIG. 1, the optical unit 3 includes: a light source device 4; an illumination device 31 which has lens arrays 311 and 312, a polarization converting element 313, and a stacking lens 314; a color separation device 32 which has dichroic mirrors 321 and 322, and a reflection mirror 323; a relay device 33 which has an entrance side lens 331, a relay lens 333, and reflection mirrors 332 and 334; three entrance side polarization plates 34; three liquid crystal panels 35 as light modulation devices; three exit side polarization plates 36; a cross dichroic prism 37 as a color combining device; the projection lens 38 as a projection device; and an optical component housing 39 which accommodates the respective optical components 31 through 37 and supports the projection lens 38.

According to the optical unit 3 having this structure, light emitted from the light source device 4 and transmitted through the illumination device 31 is divided into three color lights of red (R), green (G), and blue (B) by the color separation device 32. The divided color lights are modulated by the corresponding liquid crystal panels 35, and combined into an image by the prism 37 to be projected onto the screen through the projection lens 38.

Structure of Light Source Device

Figure 2:
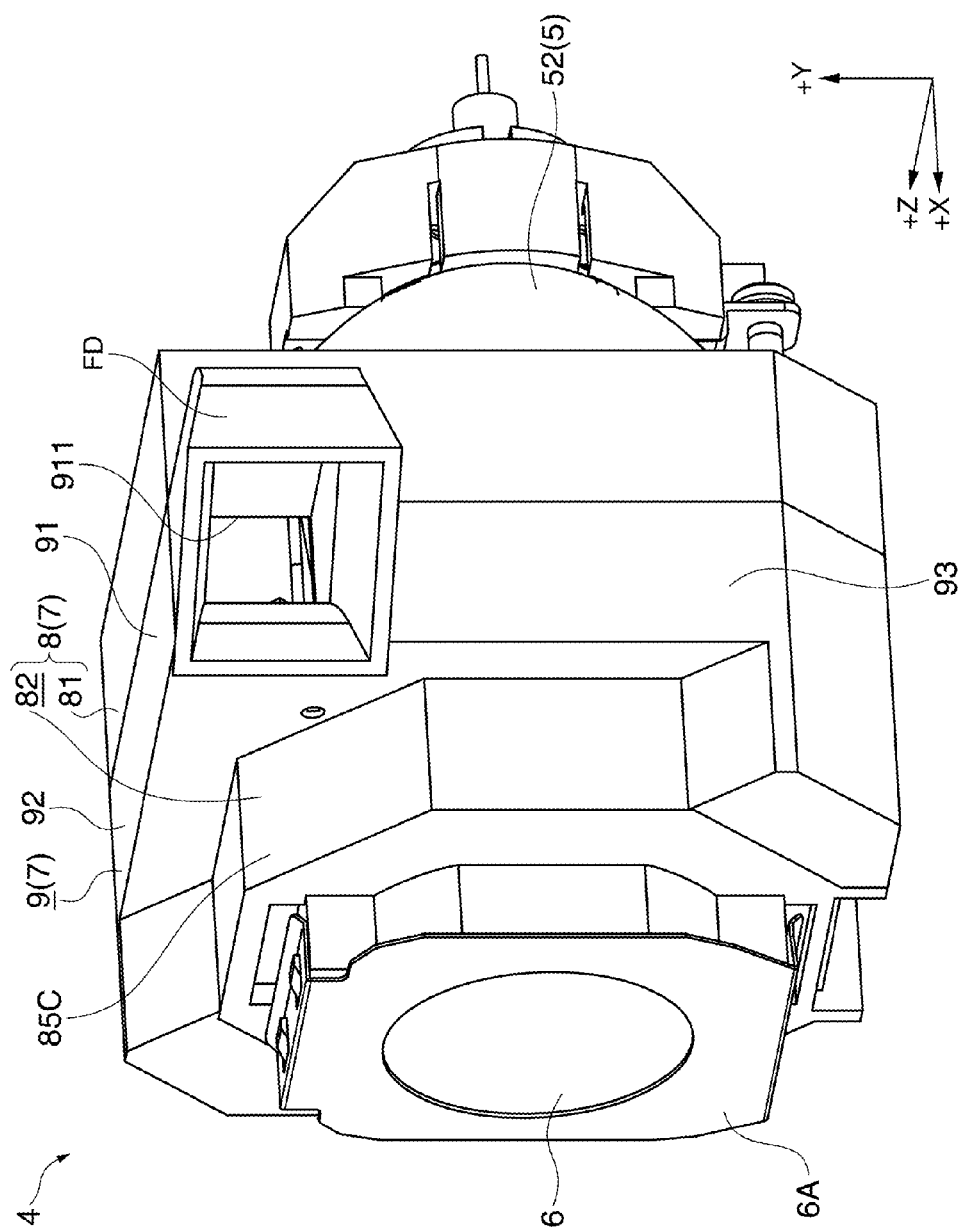
FIG. 2 is a perspective view illustrating the structure of a light source device according to the first embodiment.
Figure 3:
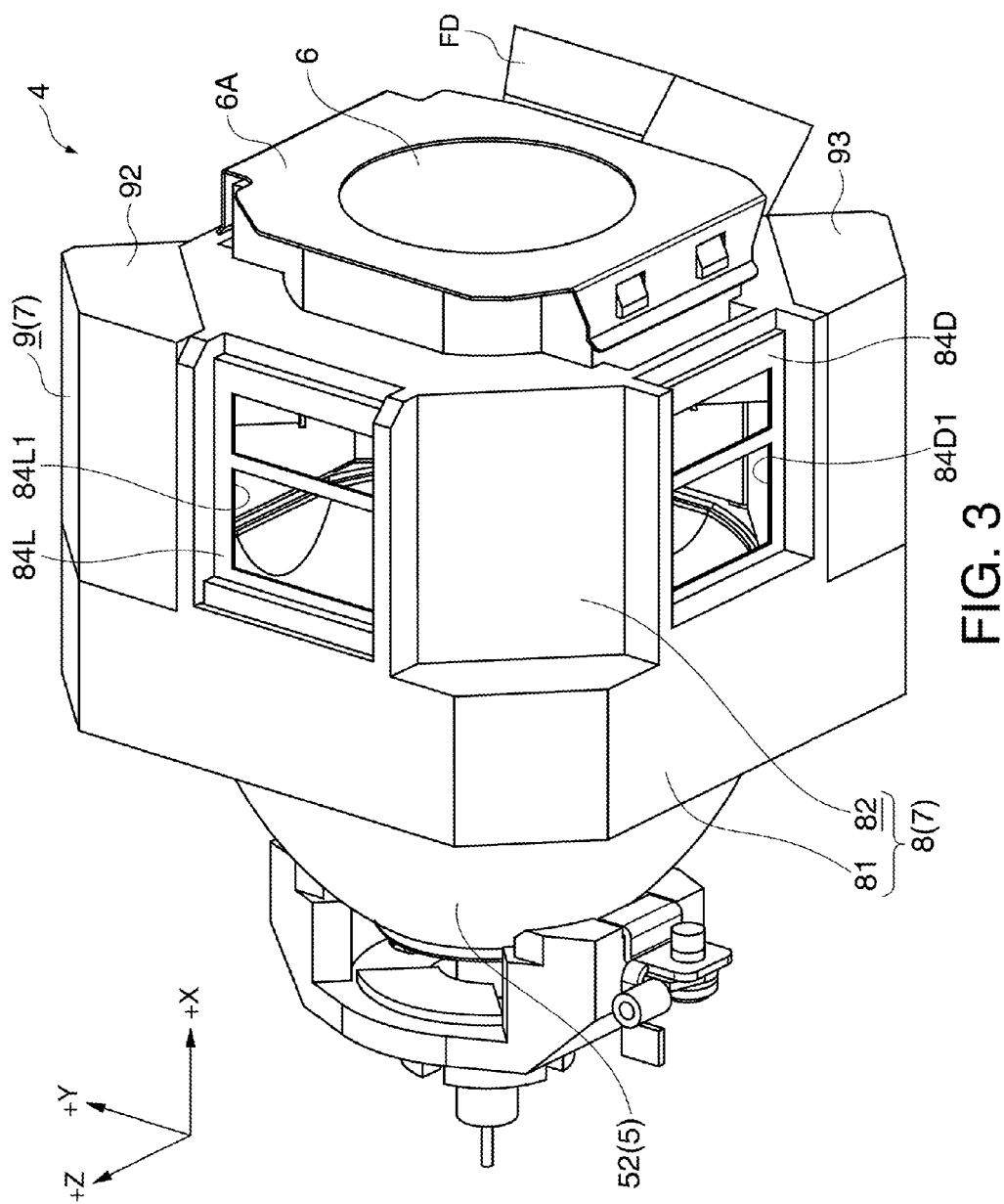
FIG. 3 is a perspective view illustrating the structure of the light source device according to the first embodiment.

FIGS. 2 and 3 are perspective views illustrating the structure of the light source device 4. More specifically, FIG. 2 is a perspective view of the light source device 4 as viewed from the rear side (−Z axis side) and the +Y axis side, while FIG. 3 is a perspective view of the light source device 4 as viewed from the front side (+Z axis side) and the −Y axis side.

As illustrated in FIGS. 1 through 3, the light source device 4 includes a lamp unit 5 (FIG. 1) which emits light, a collimating lens 6 which converts the light emitted from the lamp unit 5 into substantially parallel light, a support member (FIGS. 2 and 3) which supports the lamp unit 5 and the collimating lens 6, and a cooling fan F (FIG. 1) which supplies air.

Structure of Lamp Unit

Figure 4:
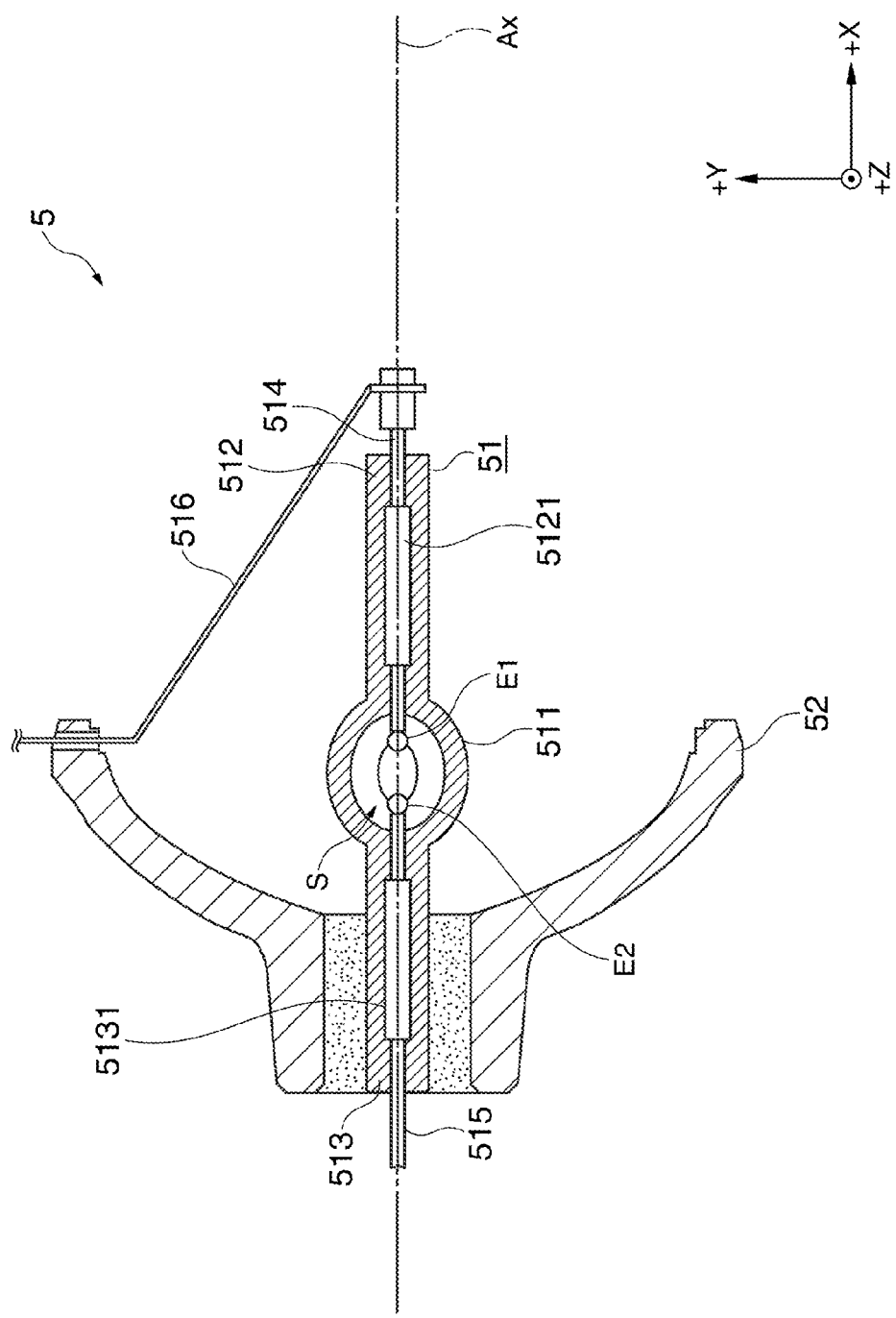
FIG. 4 illustrates the structure of a lamp unit according to the first embodiment.

FIG. 4 illustrates the structure of the lamp unit 5. More specifically, FIG. 4 is a cross-sectional view of the lamp unit 5 as viewed from the +Z axis side (front side).

As illustrated in FIGS. 1 and 4, the lamp unit 5 includes an arc tube 51 and a reflector 52 as a reflection mirror.

As can be seen from FIG. 4, the arc tube 51 has a light emission portion 511 which expands substantially in a spherical shape, and a pair of sealing portions 512 and 513 which extend in directions away from each other from both ends of the light emission portion 511 with the light emission portion 511 disposed between the sealing portions 512 and 513.

In the following description, the sealing portion 512 of the two sealing portions 512 and 513 disposed on the front side in the light emission direction (+X axis side) is referred to as the front sealing portion 512, while the sealing portion 513 disposed on the rear side in the light emission direction (−X axis side) is referred to as the rear sealing portion 513, for convenience of explanation.

As illustrated in FIG. 4, the light emission portion 511 includes a pair of electrodes E1 and E2 internally, and a discharge space S disposed between the pair of the electrodes E1 and E2 as a space into which light emission substances including mercury, rear gas, and a small amount of halogen are sealed.

Metal foils 5121 and 5131 made of molybdenum are inserted into the corresponding sealing portions 512 and 513 to electrically connect with the electrodes E1 and E2, respectively. The ends of the sealing portions 512 and 513 on the sides opposite to the light emission portion 511 are sealed by glass material or the like.

Electrode extension lines 514 and 515 extended to the outside of the arc tube 51 connect with the metal foils 5121 and 5131, respectively. When voltage is applied to the electrode extension lines 514 and 515, the interior of the light emission portion 511 emits light.

For allowing application of voltage to the electrode extension line 514, one end of a lead 516 is welded to the electrode extension line 514 provided on the front sealing portion 512.

The reflector 52 has a function of converging received light on a predetermined focal position by reflection.

The rear sealing portion 513 of the arc tube 51 is fixed to the reflector 52 in such a position that the light emission center of the light emission portion 511 is located at the focal position of the reflector 52.

Thus, as illustrated in FIG. 4, the arc tube 51 is disposed inside the reflector 52 whose cross-sectional shape expands substantially in a concave form.

Structure of Support Member

Figure 5:
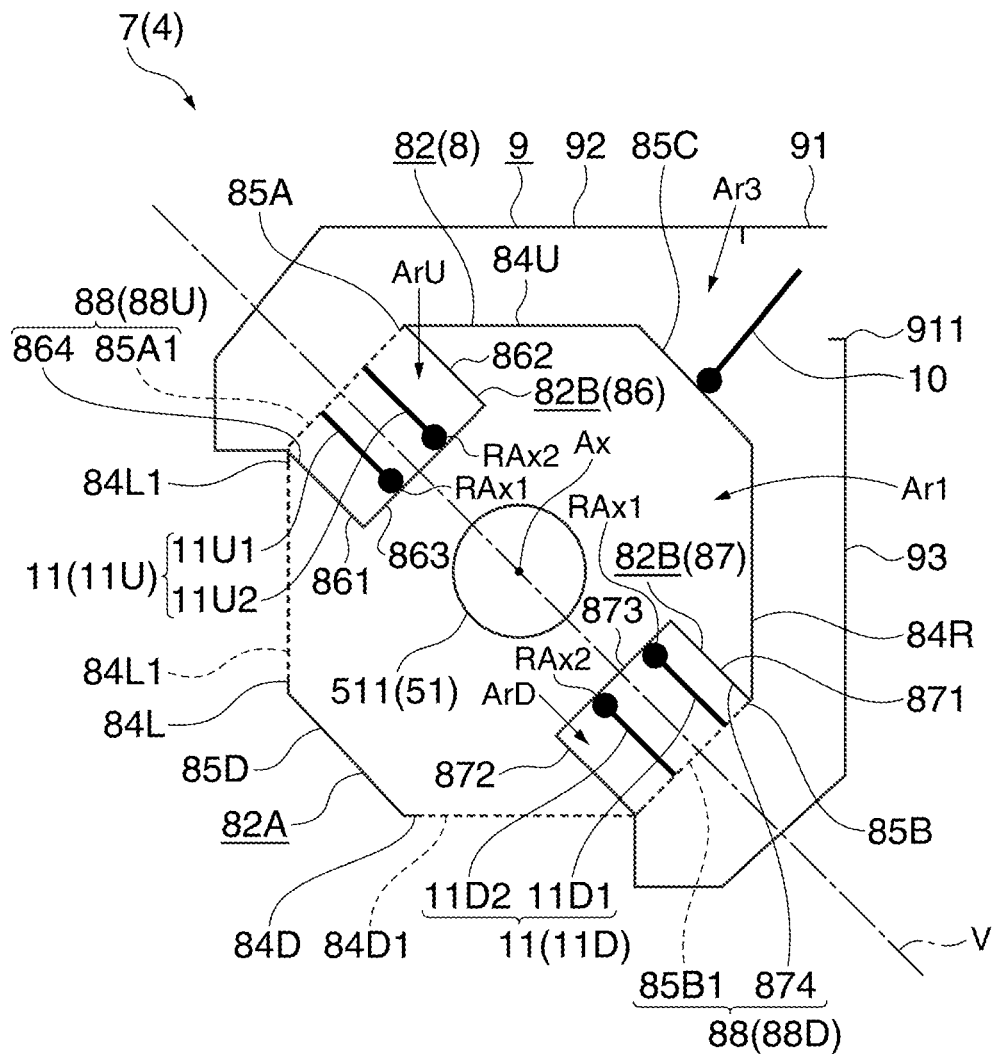
FIG. 5 schematically illustrates the interior of a support member according to the first embodiment.

FIG. 5 schematically illustrates the interior of the support member 7. More specifically, FIG. 5 illustrates the inside of the support member 7 as viewed from the +X axis side (front side in the light emission direction).

The support member 7 has a function of combining the lamp unit 5 and the collimating lens 6 into one body, and a function of guiding air delivered from the cooling fan F toward a predetermined position.

As illustrated in FIGS. 2, 3, and 5, the support member 7 has a column-shaped member 8, a cover member 9, a channel switching mechanism 10 (FIG. 5), and rectifying members 11 (FIG. 5).

Structure of Column-shaped Member

Figure 6:
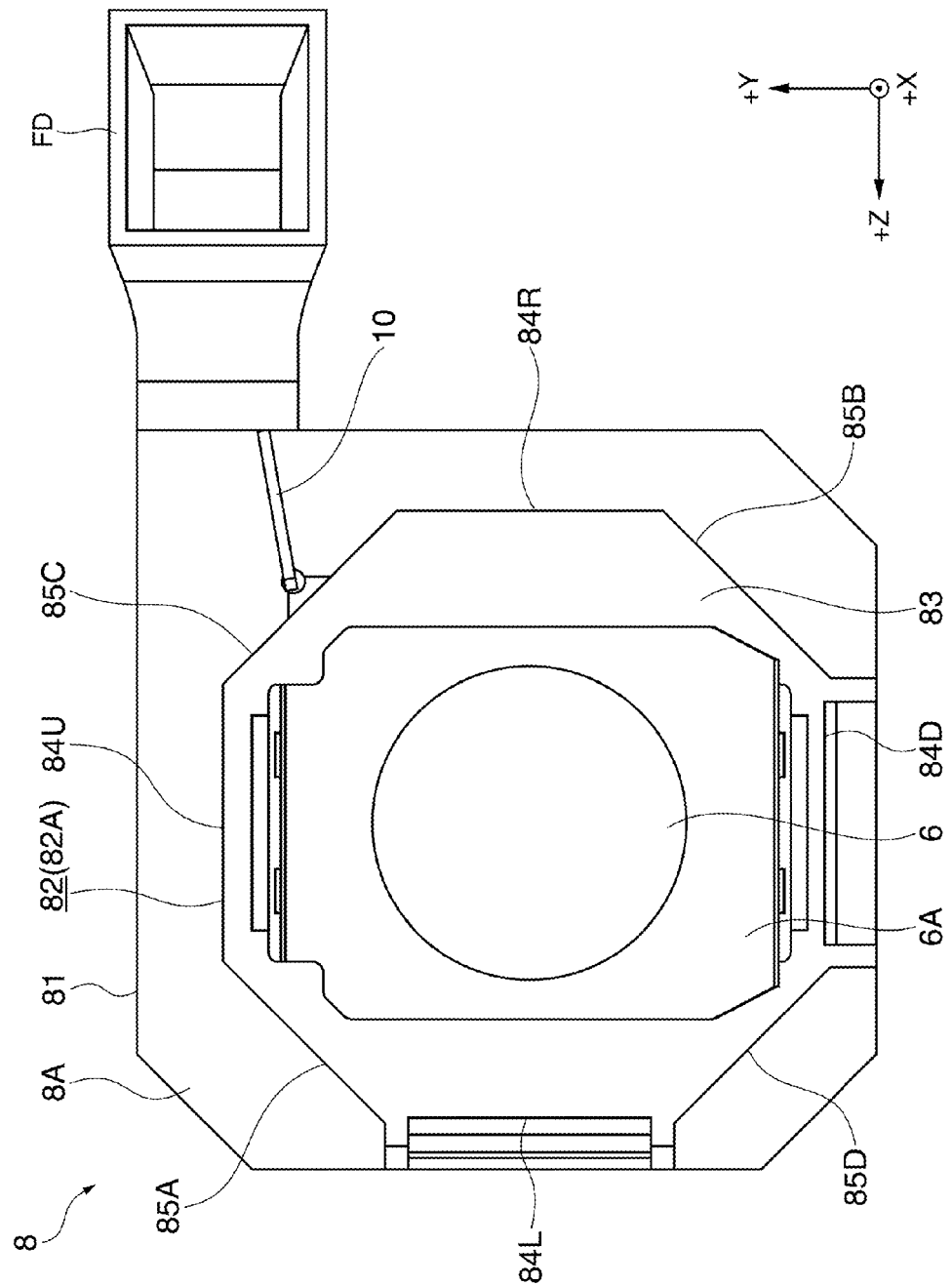
FIG. 6 illustrates the structure of a column-shaped member according to the first embodiment.
Figure 7:
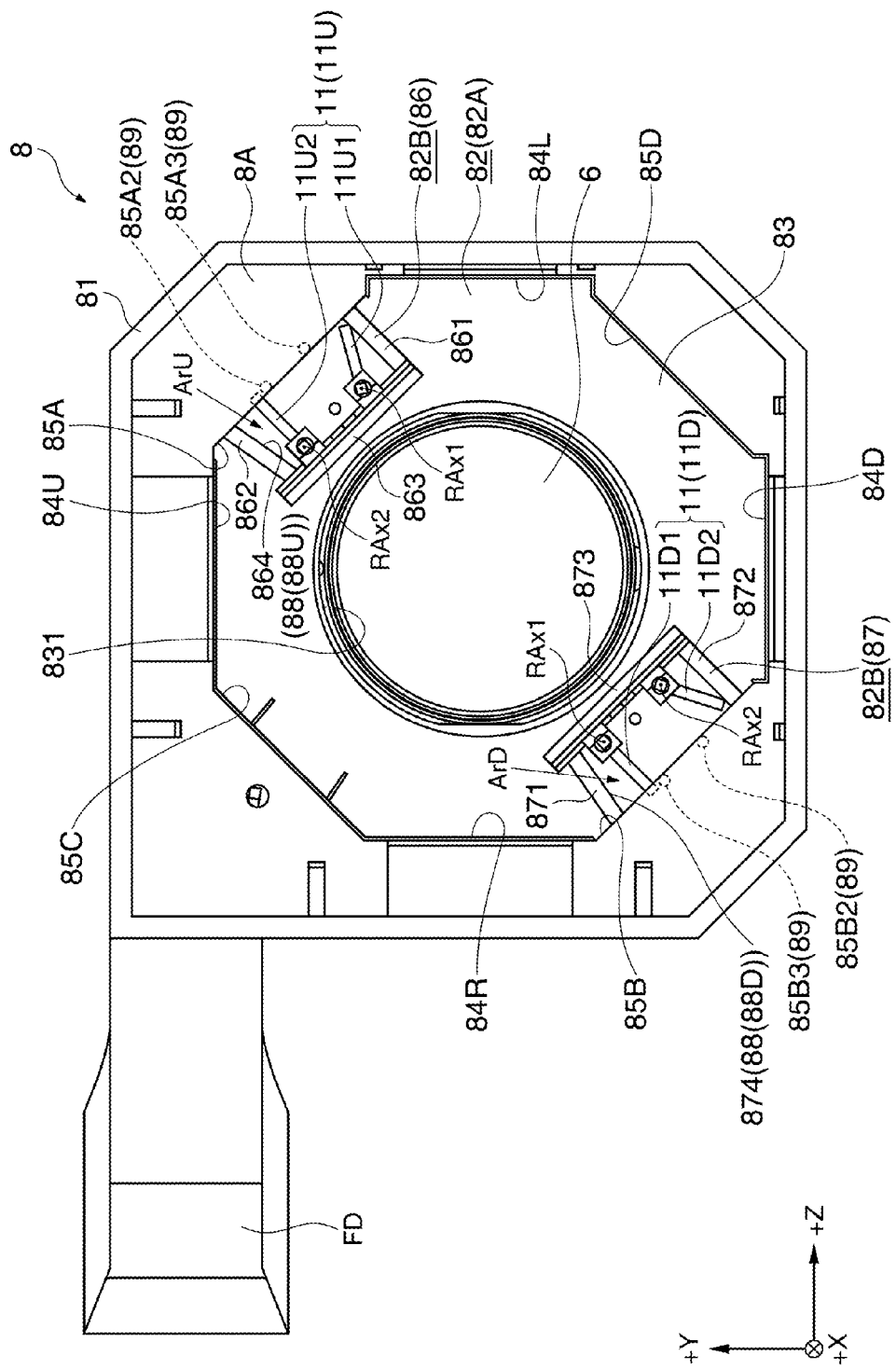
FIG. 7 illustrates the structure of the column-shaped member according to the first embodiment.

FIGS. 6 and 7 illustrate the structure of the column-shaped member 8. More specifically, FIG. 6 shows the column-shaped member 8 as viewed from the +X axis side (front side in the light emission direction), while FIG. 7 shows the column-shaped member 8 as viewed from the −X axis side (rear side in the light emission direction).

The column-shaped member 8 surrounds the arc tube 51 and extends in the direction of a center line Ax of the arc tube 51 (FIGS. 1, 4, and 5).

More specifically, as illustrated in FIGS. 2, 3, 6 and 7, the column-shaped member 8 has a first column-shaped portion 81 disposed on the −X axis side (rear side in the light emission direction), and a second column-shaped portion 82 disposed on the +X axis side (front side in the light emission direction) and having a smaller external shape than that of the first column-shaped portion 81. The first and second column-shaped portions 81 and 82 are combined into one body with a step 8A (FIGS. 6 and 7) provided between the first and second column-shaped portions 81 and 82.

The lamp unit 5 is fixed to the column-shaped member 8 by the contact between the step 8A and the end of the reflector 52 on the +X axis side (front side in the light emission direction) which has a cross-sectional shape expanding substantially in a concave form.

As illustrated in FIGS. 2, 3, and 6, the collimating lens 6 is fixed to the +X axis side (front side in the light emission direction) of the second column-shaped portion 82 via a flat spring 6A.

According to this structure, the −X axis side (rear side in the light emission direction) of the opened area of the second column-shaped portion 82 is closed by the lamp unit 5, while the +X axis side (front side in the light emission direction) of the opened area of the second column-shaped portion 82 is closed by the collimating lens 6 by attachment of the lamp unit 5 and the collimating lens 6 to the column-shaped member 8 in the manner described above. In this condition, a first space Ar1 (see FIGS. 10 and 11) surrounded by the second column-shaped portion 82, the lamp unit 5, and the collimating lens 6 is produced.

As illustrated in FIGS. 5 through 7, the second column-shaped portion 82 has a column-shaped main body 82A, and two accommodating portions 82B (FIGS. 5 and 7).

As illustrated in FIGS. 5 through 7, the second column-shaped main body 82A has a front wall 83 (FIGS. 6 and 7), an upper side wall 84U, a lower side wall 84D, a left side wall 84L, a right side wall 84R, and four crossing walls 85A through 85D, forming a hexagonal shape as viewed from the +X axis side (front side in the light emission direction).

As illustrated in FIGS. 6 and 7, the front wall 83 is disposed on the +X axis side (front side in the light emission direction) of the second column-shaped portion 82 and extended in a direction substantially perpendicular to the center axis Ax as a portion to which the collimating lens 6 is attached.

As illustrated in FIG. 7, a circular opening 831 is formed substantially at the center of the front wall 83 as an opening through which light is allowed to pass.

In this arrangement, the collimating lens 6 fitted to the opening 831 is attached to the front wall 83 via the flat spring 6A.

As illustrated in FIGS. 5 through 7, the upper and lower side walls 84U and 84D are disposed on the top side and the bottom side of the projector 1, respectively, in such positions as to be opposed to each other, and extend along the X-Z plane.

As illustrated in FIGS. 3 and 5, an air outlet port 84D1 is formed in the lower side wall 84D as a port through which air within the first space Ar1 is discharged.

As illustrated in FIGS. 5 through 7, the left and right side walls 84L and 84R are disposed on the +Z axis side (front side) and the −Z axis side (rear side) in such positions as to be opposed to each other, and extend along the X-Y plane.

As illustrated in FIGS. 3 and 5, an air outlet port 84L1 is formed in the left side wall 84L as a port through which air within the first space An is discharged similarly to the lower side wall 84D.

As illustrated in FIGS. 5 through 7, the four crossing walls 85A through 85D are constituted by the left upper crossing wall 85A connecting the upper and left side walls 84U and 84L, the right lower crossing wall 85B connecting the lower and right side walls 84D and 84R, the right upper crossing wall 85C connecting the upper and right side walls 84U and 84R, and the left lower crossing wall 85D connecting the lower and left side walls 84D and 84L.

A first left upper communicating port 85A1 indicated by a broken line in FIG. 5 is formed on the +X axis side (front side in the light emission direction) of the left upper crossing wall 85A as a first communicating port through which the inside and the outside of the device communicate with each other.

As illustrated in FIG. 7, a pair of projections 85A2 and 85A3 are provided on the edge of the first left upper communicating port 85A1 to regulate the rotation of the rectifying member 11.

On the other hand, a first right lower communicating port 85B1 indicated by a broke line in FIG. 5 is similarly formed on the +X axis side (front side in the light emission direction) of the right lower crossing wall 85B as a first communicating port through which the inside and the outside of the device communicate with each other.

Moreover, a pair of projections 85B2 and 85B3 (FIG. 7) similar to the projections 85A2 and 85A3 formed on the first left upper communicating port 85A1 are provided on the edge of the first right lower communicating port 85B1.

Furthermore, a supplementary air supply port 85C1 (see FIG. 11) communicating with the first space Ar1 is formed on the −X side (rear side in the light emission direction) of the right upper crossing wall 85C.

As illustrated in FIGS. 5 and 7, the two accommodating portions 82B are provided inside the column-shaped main body 82A. Each of the accommodating portions 82B is a hollow area having a substantially rectangular parallelepiped shape within which the corresponding rectifying member 11 is accommodated.

In the following description, the two accommodating portions 82B are referred to as a left upper accommodating portion 86 and a right lower accommodating portion 87 in correspondence with the left upper crossing wall 85A and the right lower crossing wall 85B.

As illustrated in FIGS. 5 and 7, the left upper accommodating portion 86 has first through third walls 861 through 863 as three walls.

The first and second walls 861 and 862 project from the inner surface of the front wall 83 toward the −X axis side (rear side in the light emission direction) substantially in parallel with each other, and connect with the inner surface of the left upper crossing wall 85A substantially at right angles.

The third wall 863 projects from the inner surface of the front wall 83 toward the −X axis side (rear side in the light emission direction), and connects the first and second walls 861 and 862.

The first through third walls 861 through 863 are disposed inside the left upper crossing wall 85A in such positions as to surround the first left upper communicating port 85A1, and produce a second space ArU (FIGS. 5 and 7) communicating with the outside via the first left upper communicating port 85A1.

According to this embodiment, the side wall of the left upper accommodating portion 86 on the −X axis side (rear side in the light emission direction) is eliminated as obvious from the above description.

In this case, the area of the left upper accommodating portion 86 on the −X axis side (the inside of the rectangular frame surrounded by the −X axis side ends of the first through third walls 861 through 863 and the inner surface of the left upper crossing wall 85A) functions as a second left upper communicating port 864 as a second communicating port according to the invention which connects the first space Ar1 and the second space ArU such that these spaces Ar1 and ArU can communicate with each other as illustrated in FIGS. 5 and 7.

As can be seen from FIGS. 5 and 7, a second space ArD for accommodating the rectifying member 11 is produced between the right lower accommodating portion 87 and the right lower crossing wall 85B. The right lower accommodating portion 87 has first through third wall 871 through 873 similarly to the left upper accommodating portion 86.

As illustrated in FIGS. 5 and 7, the −X axis side (rear side in the light emission direction) of the right lower accommodating portion 87 functions as a second right lower communicating port 874 as the second communicating port according to the invention which connects the first space An and the second space ArD such that these spaces An and ArD can communicate with each other, similarly to the left upper accommodating portion 86.

The first left upper communicating port 85A1, the second left upper communicating port 864, the first right lower communicating port 85B1, and the second right lower communicating port 874 thus constructed constitute communicating ports 88 (88U and 88D (FIGS. 5 and 7)) corresponding to communicating ports according to the invention.

As illustrated in FIG. 5, the pair of the communicating ports 88 are provided on a virtual line V passing through the center line Ax and crossing the vertical direction (direction along the Y axis) and the horizontal direction (direction along the Z axis) at 45 degrees for each as viewed in the direction along the center line Ax.

Structure of Cover Member

The cover member 9 attached to the outer surface of the column-shaped member 8 extends in the circumferential direction of the column-shaped member 8 to form a third space Ar3 (FIG. 5) between the outer surface of the column-shaped member 8 and the cover member 9 as a space through which air is allowed to flow.

The cover member 9 introduces air delivered from the cooling fan F through a first channel R1 or a second channel R2 (see FIGS. 9 and 12 through 14) formed between the outer surface of the column-shaped member 8 and the cover member 9 toward the corresponding communicating port 88.

As illustrated in FIGS. 2, 3, and 5, the cover member 9 has an introduction portion 91 (FIGS. 2 and 5), and first and second cover portions 92 and 93 as a pair of ducts, forming a substantially L shape as viewed from the +X axis side (front side in the light emission direction).

As illustrated in FIGS. 2 and 5, the introduction portion 91 is located at a position opposed to the −X axis side (rear side in the light emission direction) of the right upper crossing wall 85C after attachment of the cover member 9 to the outer surface of the column-shaped member 8.

The introduction portion 91 has an introduction port 911 (FIGS. 2 and 5) connected with a duct FD (FIGS. 1 through 3) to introduce air delivered from the cooling fan F toward the third space Ar3 via the duct FD and the introduction port 911.

As illustrated in FIGS. 2 and 5, after attachment of the cover member 9 to the outer surface of the column-shaped member 8, the first cover portion 92 connects with the introduction portion 91 and extends along the upper side wall 84U toward the left upper crossing wall 85A, where the end of the first cover portion 92 further extends toward the +X axis side (toward the first left upper communicating port 85A1).

The space formed between the first cover portion 92 and the outer surface of the column-shaped member 8 forms the first channel R1 (see FIGS. 9 and 13) along which air introduced into the third space Ar3 flows toward the first left upper communicating port 85A1.

On the other hand, as illustrated in FIGS. 2 and 5, after attachment of the cover member 9 to the outer surface of the column-shaped member 8, the second cover portion 93 connects with the introduction portion 91 and extends along the right side wall 84R toward the right lower crossing wall 85B, where the end of the second cover portion 93 further extends toward the +X axis side (toward the first right lower communicating port 85B1).

The space formed between the second cover portion 93 and the outer surface of the column-shaped member 8 forms the second channel R2 (see FIGS. 12 and 14) along which air introduced into the third space Ar3 flows toward the first right lower communicating port 85B1.

Structure of Channel Switching Mechanism

The channel switching mechanism 10 switches the flow route of air introduced into the third space Ar3 via the introduction port 911 between the first channel R1 and the second channel R2. As illustrated in FIGS. 5 and 6, the channel switching mechanism 10 is disposed at a position opposed to the right upper crossing wall 85C (within the introduction portion 91).

As illustrated in FIG. 6, the channel switching mechanism 10 having a substantially rectangular plate shape is pivotally supported on the step 8A and the side wall of the introduction portion 91 on the +X axis side (front side in the light emission direction) after attachment of the cover member 9 to the outer surface of the column-shaped member 8.

Structure of Rectifying Member

As illustrated in FIGS. 5 and 7, each of the rectifying members 11 is accommodated within the corresponding accommodating portion 86 or 87 in such a manner as to be rotatable by the own weight of the rectifying member 11. Each of the rectifying members 11 rotates by its own weight to rectify the flow of air introduced into the first space Ar1 via the corresponding communicating port 88 toward the light emission portion 511.

In the following description, the two rectifying members 11 are referred to as a left upper rectifying member 11U and a right lower rectifying member 11D in correspondence with the left upper accommodating portion 86 and the right lower accommodating portion 87.

As illustrated in FIGS. 5 and 7, the left upper rectifying member 11U is constituted by a pair of a first left upper rectifying plate 11U1 as a first rectifying plate, and a second left upper rectifying plate 11U2 as a second rectifying plate.

As illustrated in FIGS. 5 and 7, the first and second left upper rectifying plates 11U1 and 11U2 are pivotally supported on the inner surface of the third wall 863 of the left upper accommodating portion 86 in such a manner as to be rotatable around rotation axis RAx1 and RAx2 extending in parallel with the center line Ax.

The first left upper rectifying plate 11U1 is attached on the side near the first wall 861 with respect to the second left upper rectifying plate 11U2.

As illustrated in FIGS. 5 and 7, the right lower rectifying member 11D has a structure similar to that of the left upper rectifying member 11U, as a unit constituted by a pair of a first right lower rectifying plate 11D1 as a first rectifying plate, and a second right lower rectifying plate 11D2 as a second rectifying plate.

Route of Air Delivered from Cooling Fan

The route of air delivered from the cooling fan F is now explained.

According to this embodiment, the route of air delivered from the cooling fan F varies according to the position of the projector 1 by the functions of the channel switching mechanism 10 and the rectifying members 11.

Therefore, in the following description, the positions of the projector 1 will be initially explained, thereafter the routes of air for the respective positions of the projector 1 will be sequentially discussed.

Positions of Projector

FIGS. 8A through 8D schematically illustrate the positions of the projector 1.

As illustrated in FIGS. 8A through 8D, the projector 1 in this embodiment can be installed in various positions.

Figure 8A:
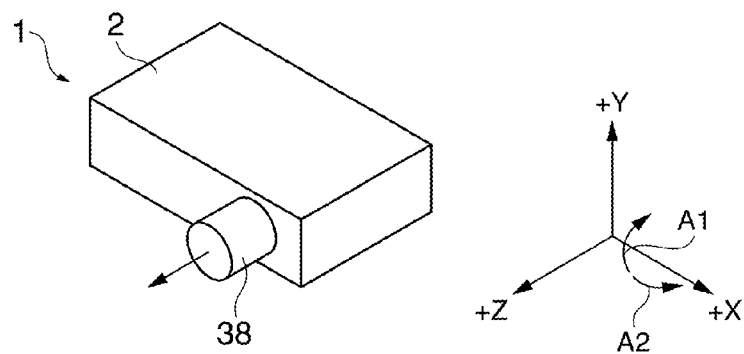
FIGS. 8A through 8D schematically illustrate positions of the projector according to the first embodiment.

For example, the projector 1 can be placed in a normal position as illustrated in FIG. 8A.

The normal position corresponds to the position in which the projection direction from the projection lens 38 (+Z axis) extends substantially in parallel with the horizontal direction.

Figure 8B:
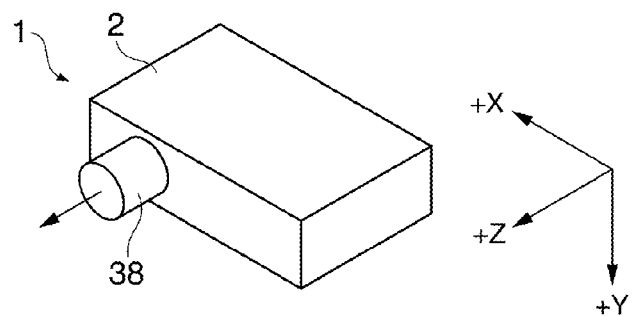

Also, as illustrated in FIG. 8B, the projector 1 can be installed in a ceiling mounted position. The ceiling mounted position corresponds to the position rotated through 180 degrees around the X axis (center line Ax) from the condition of the normal position (FIG. 8A).

Figure 8C:
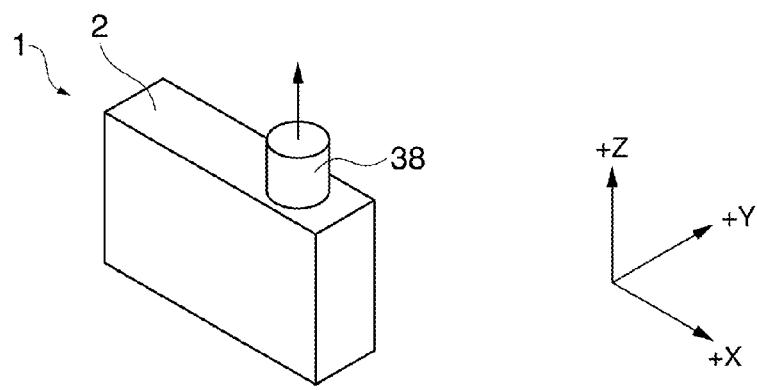

Moreover, as illustrated in FIG. 8C, the projector 1 can be installed in an upward projection direction.

As illustrated in FIG. 8C, the upward projection position corresponds to the position in which the projector 1 is rotated in a direction of an arrow A1 (FIG. 8A) around the X axis (center line Ax) from the condition of the normal position (FIG. 8A) such that the projection direction from the projection lens 38 (+Z axis) extends upward.

Figure 8D:
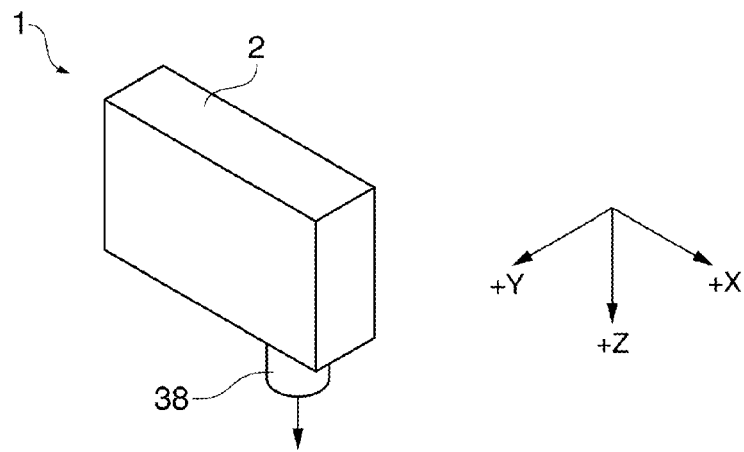

Furthermore, as illustrated in FIG. 8D, the projector 1 can be installed in a downward projection position.

As illustrated in FIG. 8D, the downward projection position corresponds to the position of the projector 1 rotated in a direction of an arrow A2 (FIG. 8A) around the X axis from the condition of the normal position (FIG. 8A) such that the projection direction from the projection lens 38 (+Z axis) extends downward.

Route of Air in Normal Position

Figure 9:
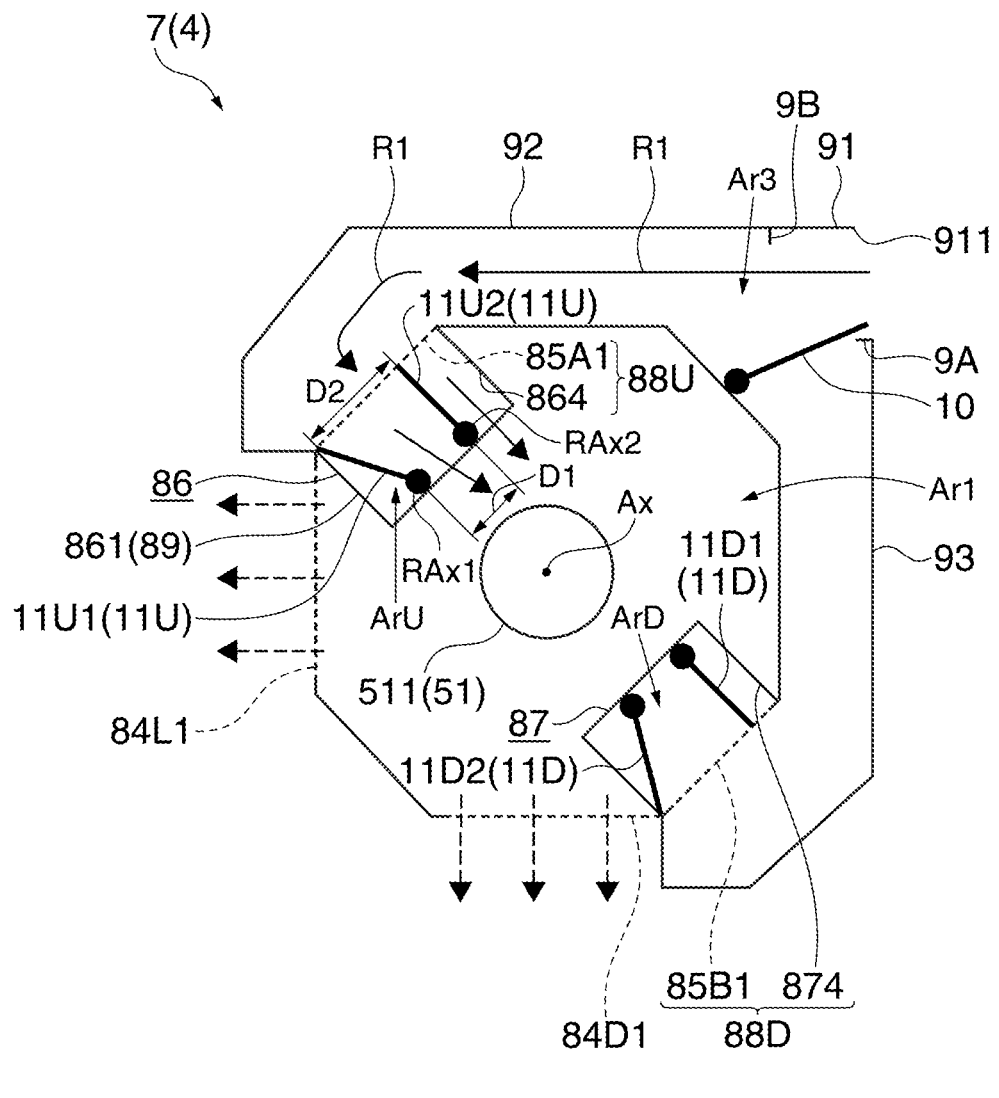
FIG. 9 illustrates a flow route in a normal position according to the first embodiment.
Figure 10:
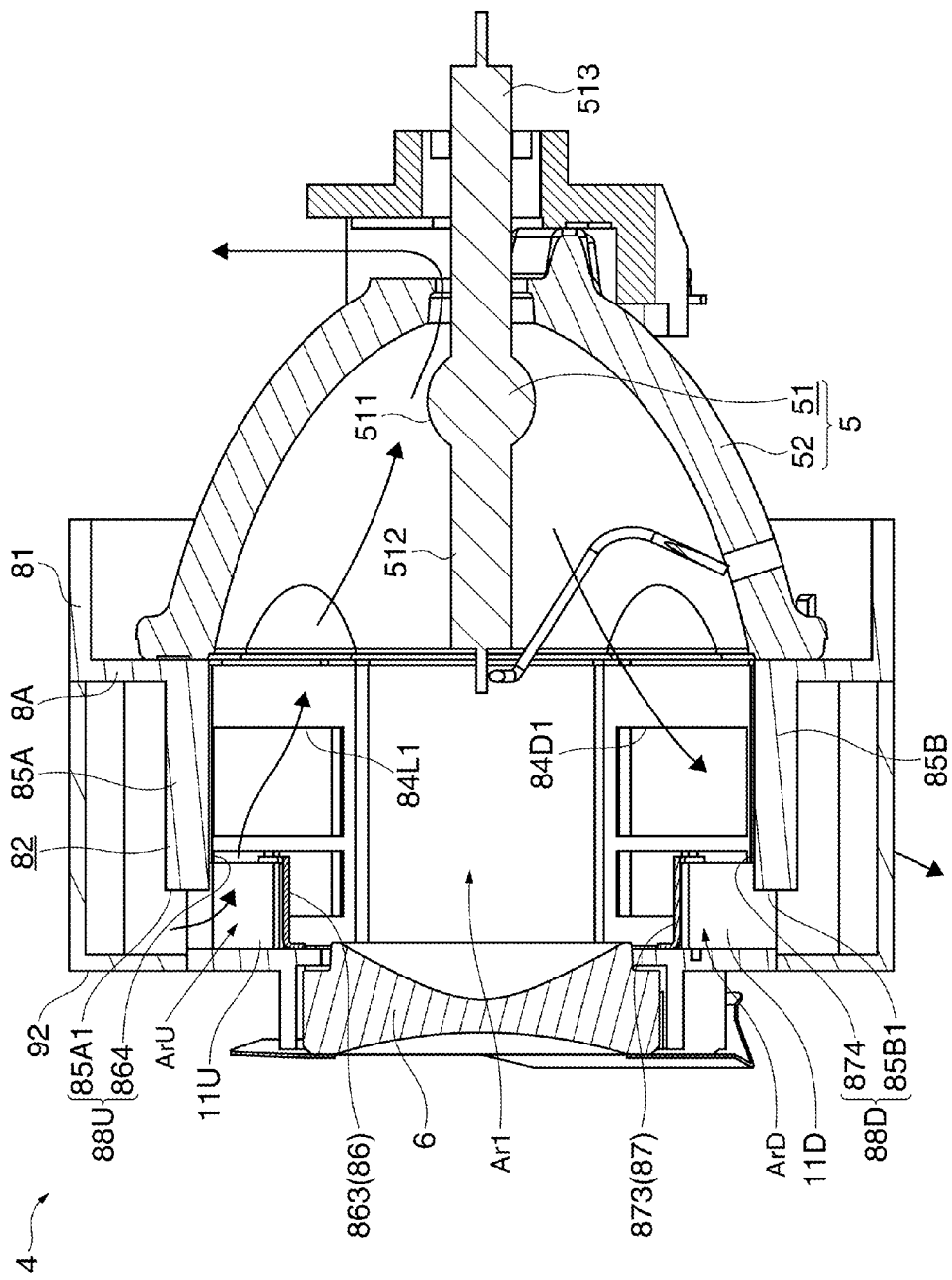
FIG. 10 illustrates the flow route in the normal position according to the first embodiment.
Figure 11:
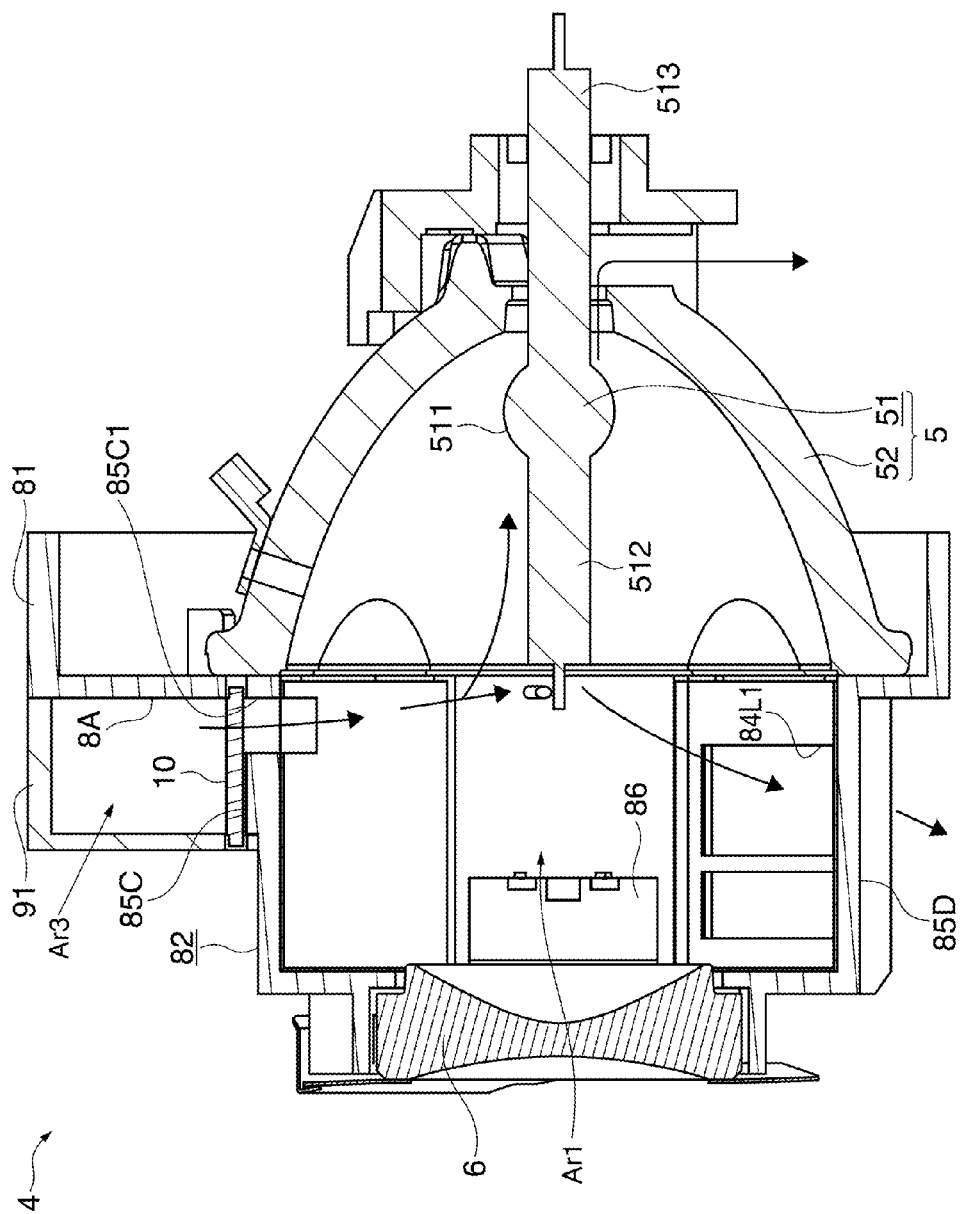
FIG. 11 illustrates the flow route in the normal position according to the first embodiment.

FIGS. 9 through 11 illustrate the route of air in the normal position. More specifically, FIG. 9 schematically illustrates the interior of the support member 7 in the normal position as viewed from the +X axis side (front side in the light emission direction). FIG. 10 is a cross-sectional view of the light source device 4 in the normal position taken along the plane passing through the left upper crossing wall 85A, the center line Ax, and the right lower crossing wall 85B. FIG. 11 is a cross-sectional view of the light source device 4 in the normal position taken along the plane passing through the right upper crossing wall 85C, the center line Ax, and the left lower crossing wall 85D.

In FIG. 9, the up-down direction extends along the vertical axis corresponding to the direction of gravity of the light source device 4 for convenience of explanation. This applies to FIGS. 12 through 14 as well.

As illustrated in FIG. 9, the channel switching mechanism 10 in the normal position rotates by its own weight until the rotation of the channel switching mechanism 10 is regulated by a first regulating member 9A of the cover member 9 to block the space between the introduction port 911 and the second channel R2.

Therefore, the air introduced into the third space Ar3 from the cooling fan F through the duct FD and the introduction port 911 flows along the first channel R1 as illustrated in FIG. 9.

Under the normal position, the left upper accommodating portion 86 is located on the diagonally left upper side with respect to the center line Ax (above the center line Ax) as viewed from the +X axis side (front side in the light emission direction) as illustrated in FIG. 9.

In this case, as illustrated in FIG. 9, the first left upper rectifying plate 11U1 accommodated within the left upper accommodating portion 86 rotates anticlockwise around the rotation axis RAx1 as viewed from the +X axis side (front side in the light emission direction) until the tip of the first left upper rectifying plate 11U1 contacts the first wall 861.

On the other hand, as illustrated in FIG. 9, the second left upper rectifying plate 11U2 rotates anticlockwise around the rotation axis RAx2 as viewed from the +X axis side (front side in the light emission direction) until the tip of the second left upper rectifying plate 11U2 contacts the projection 85A2 (FIG. 7) formed on the edge of the first left upper communicating port 85A1.

Accordingly, under the condition that the rotations of the first and second left upper rectifying plates 11U1 and 11U2 are regulated by the first wall 861 and the projection 85A2 as illustrated in FIG. 9, a distance D1 between the ends of the first and second left upper rectifying plates 11U1 and 11U2 (roots on the side away from the first left upper communicating port 85A1) becomes shorter than a distance D2 between the other ends of the first and second left upper rectifying plates 11U1 and 11U2 (tips on the side nearer to the first left upper communicating port 85A1).

The air having flowed along the first channel R1 passes through the first left upper communicating port 85A1, the second space ArU, and the second left upper communicating port 864, and enters the first space Ar1 while rectified by the left upper rectifying member 11U.

As illustrated in FIGS. 9 and 10, the air introduced into the first space Ar1 is supplied toward the top of the upper part of the light emission portion 511 to cool the upper part of the light emission portion 511.

Moreover, as illustrated in FIG. 11, a part of the air introduced into the third space Ar3 from the cooling fan F through the duct FD and the introduction port 911 is guided into the first space Ar1 via the supplementary air supply port 85C1 formed in the right upper crossing wall 85C.

As illustrated in FIG. 11, the air introduced into the first space Ar1 through the supplementary air supply port 85C1 is supplied toward the tip of the front sealing portion 512 (position to which the electrode extension line 514 and the lead 516 are welded) to cool the tip of the front sealing portion 512.

As illustrated in FIGS. 9 through 11, the airs having cooled the light emission portion 511 and the tip of the front sealing portion 512 are discharged to the outside of the light source device 4 via the air outlet ports 84D1 and 84L1, and via the clearance between the rear sealing portion 513 and the reflector 52.

The supply of air to the welding position via the supplementary air supply port 85C1, and the discharge of air via the air outlet ports 84D1 and 84L1 are similarly performed in the ceiling mounted position, the upward projection position, and the downward projection position which will be discussed hereinafter. Thus, the same explanation of these supply and discharge of air in the respective positions is not repeated herein.

Route of Air in Ceiling Mounted Position

Figure 12:
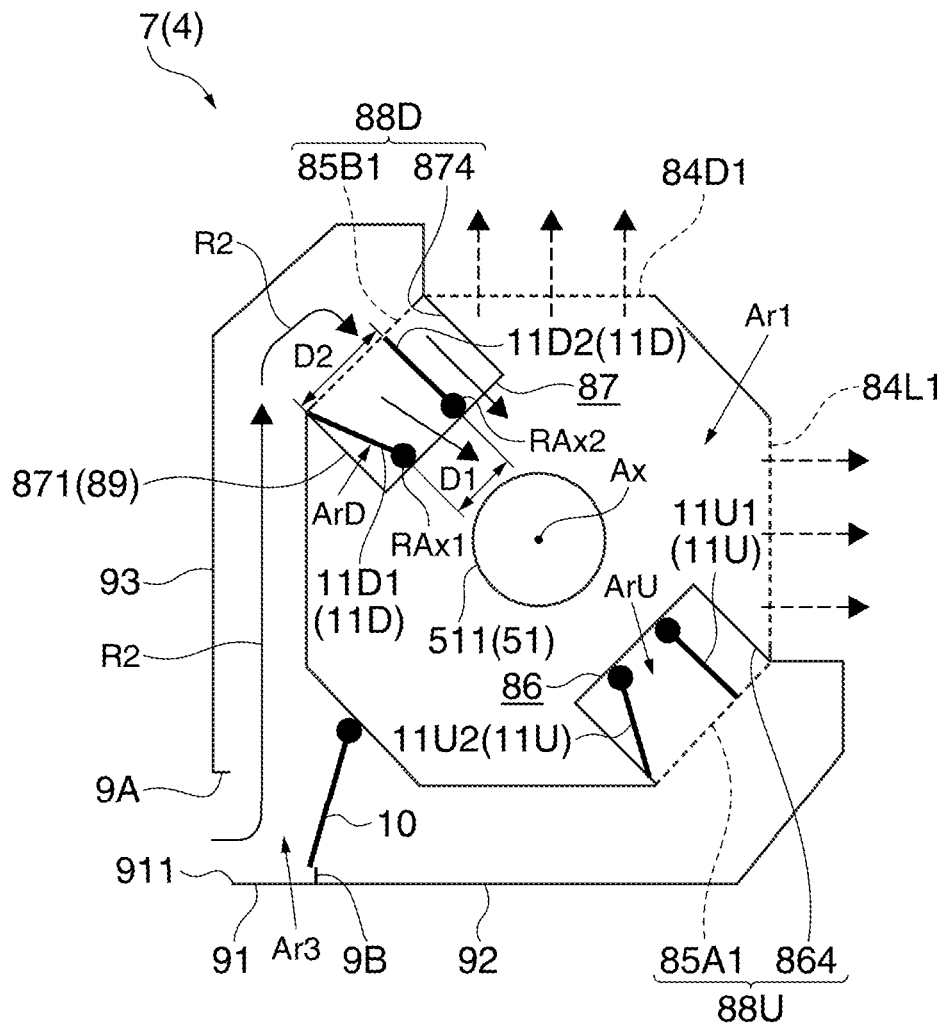
FIG. 12 illustrates a flow route in a ceiling mounted position according to the first embodiment.
Figure 12:
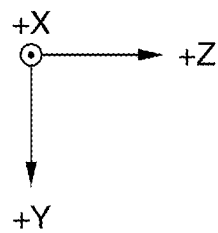

FIG. 12 illustrates the route of air in the ceiling mounted position. More specifically, FIG. 12 schematically illustrates the interior of the support member 7 in the ceiling mounted position as viewed from the +X axis side (front side in the light emission direction).

As illustrated in FIG. 12, the channel switching mechanism 10 in the ceiling mounted position rotates by its own weight until the rotation of the channel switching mechanism 10 is regulated by a second regulating member 9B of the cover member 9 to block the space between the introduction port 911 and the first channel R1.

Thus, as illustrated in FIG. 12, the air introduced from the cooling fan F through the duct FD and the introduction port 911 toward the third space Ar3 flows along the second route R2.

As illustrated in FIG. 12, under the ceiling mounted position, the right lower accommodating portion 87 is located on the diagonally left upper side with respect to the center line Ax (above the center line Ax) as viewed from the +X axis side (front side in the light emission direction).

Thus, the first and second right lower rectifying plates 11D1 and 11D2 accommodated within the right lower accommodating portion 87 behave in a manner similar to the action of the left upper rectifying member 11U under the normal position, and rotate until the respective tips of the first and second right lower rectifying plates 11D1 and 11D2 contact the first wall 871 and the projection 85B2 (FIG. 7), respectively, as illustrated in FIG. 12.

Under this condition, as illustrated in FIG. 12, the distance D1 between the ends of the first and second right lower rectifying plates 11D1 and 11D2 (roots on the side away from the first right lower communicating port 85B1) becomes shorter than the distance D2 between the other ends of the first and second right lower rectifying plates 11D1 and 11D2 (tips on the side nearer to the first right lower communicating port 85B1) similarly to the left upper rectifying member 11U in the normal position.

As illustrated in FIG. 12, the air having passed through the second channel R2 is rectified by the right lower rectifying member 11D during entrance into the first space Ar1 via the communicating port 88D, and supplied toward the top of the upper part of the light emission portion 511 similarly to the condition of the normal position.

Route of Air in Upward Projection Position

Figure 13:
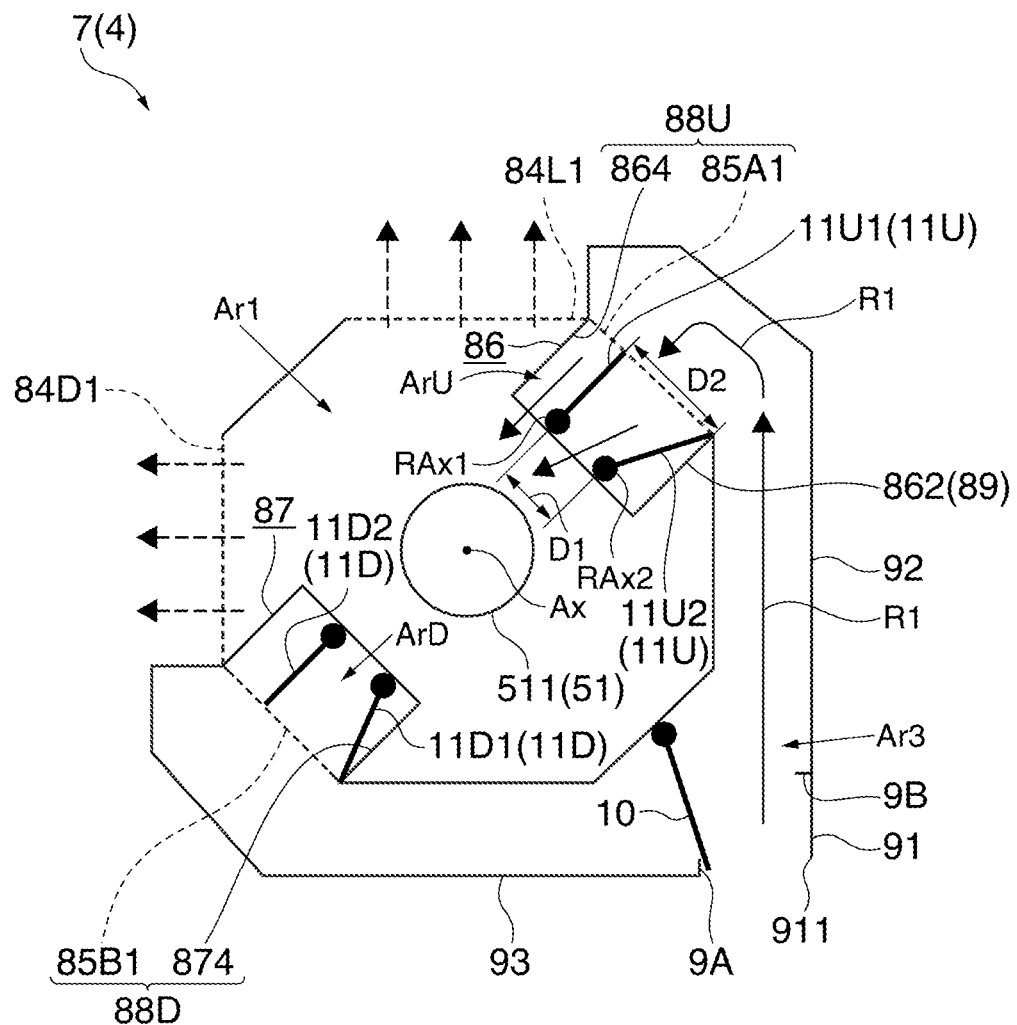
FIG. 13 illustrates a flow route in an upward projection position according to the first embodiment.

FIG. 13 illustrates the route of air in the upward projection position. More specifically, FIG. 13 schematically illustrates the interior of the support member 7 in the upward projection position as viewed from the +X axis side (front side in the light emission direction).

As illustrated in FIG. 13, the channel switching mechanism 10 in the upward projection position behaves in a manner similar to the action of the channel switching mechanism 10 under the normal position. Thus, the air from the cooling fan F flows along the first channel R1.

As illustrated in FIG. 13, the left upper accommodating portion 86 in the upward projection position is located diagonally right upper side with respect to the center line Ax (above the center line Ax) as viewed from the +X axis side (front side in the light emission direction).

Therefore, as illustrated in FIG. 13, the first left upper rectifying plate 11U1 accommodated in the left upper accommodating portion 86 rotates clockwise around the rotation axis RAx1 in the direction opposite to the direction under the normal position as viewed from the +X axis side (front side in the light emission direction) until the tip of the first left upper rectifying plate 11U1 contacts the projection 85A3 (FIG. 7) formed on the edge of the first left upper communicating port 85A1.

On the other hand, as illustrated in FIG. 13, the second left upper rectifying plate 11U2 rotates clockwise around the rotation axis RAx2 in the direction opposite to the direction under the normal position as viewed from the +X axis side (front side in the light emission direction) until the tip of the second left upper rectifying plate 11U2 contacts the second wall 862.

Under this condition, as illustrated in FIG. 13, the distance D1 between the ends of the first and second left upper rectifying plates 11U1 and 11U2 becomes shorter than the distance D2 between the other ends of the first and second left upper rectifying plates 11U1 and 11U2 similarly to the condition of the normal position.

As illustrated in FIG. 13, the air having passed along the first channel R1 is rectified by the left upper rectifying member 11U during entrance into the first space Ar1 via the communicating port 88U, and supplied toward the top of the upper part of the light emission portion 511 similarly to the condition in the normal position.

Route of Air in Downward Projection Position

Figure 14:
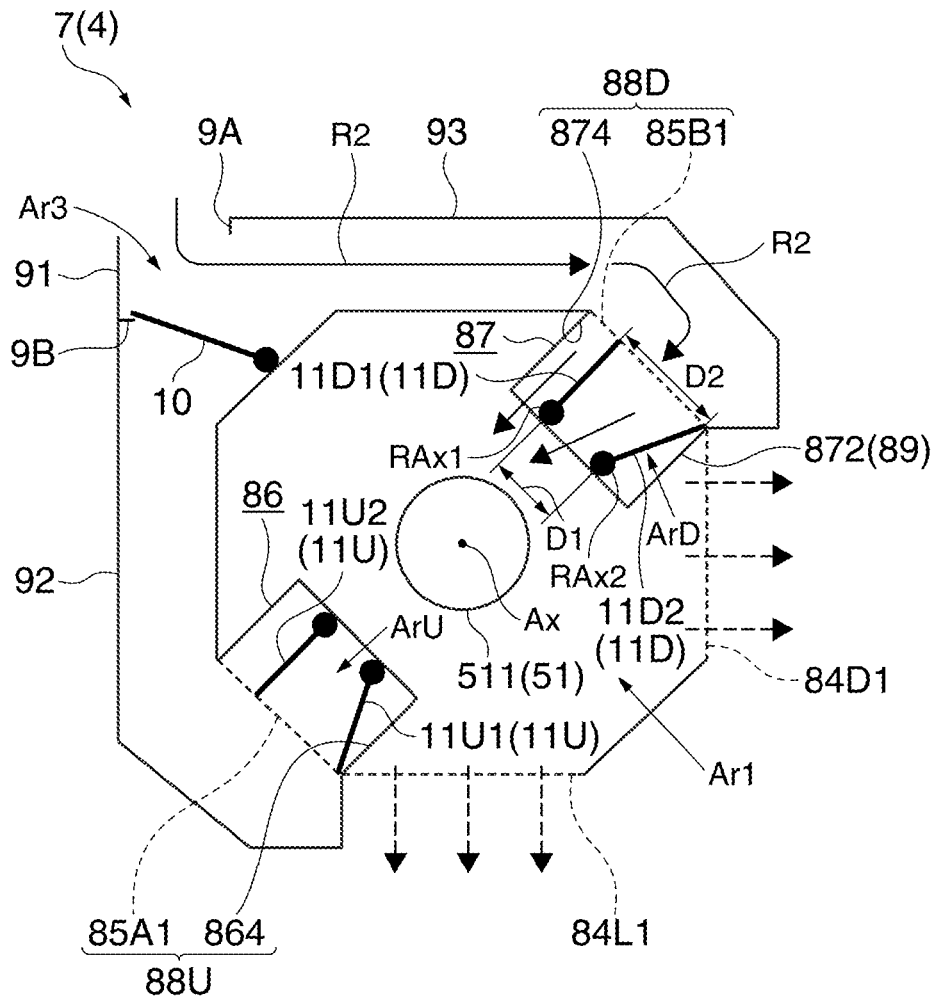
FIG. 14 illustrates a flow route in a downward projection position according to the first embodiment.
Figure 14:
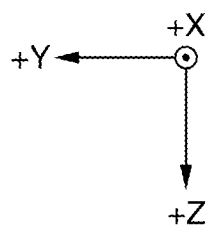

FIG. 14 illustrates the route of air in the downward projection position. More specifically, FIG. 14 schematically illustrates the interior of the support member 7 in the downward projection position as viewed from the +X axis side (front side in the light emission direction).

As illustrated in FIG. 14, the channel switching mechanism 10 in the downward projection position behaves in a manner similar to the action of the channel switching mechanism 10 under the ceiling mounted position. Thus, the air from the cooling fan F flows along the second channel R2.

As illustrated in FIG. 14, the right lower accommodating portion 87 in the downward projection position is located diagonally right upper side with respect to the center line Ax (above the center line Ax) as viewed from the +X axis side (front side in the light emission direction).

Therefore, as illustrated in FIG. 14, the first and second right lower rectifying plates 11D1 and 11D2 accommodated in the right lower accommodating portion 87 behave in a manner similar to the action of the left upper rectifying member 11U under the upward projection position, and rotate until the respective tips of the first and second right lower rectifying plates 11D1 and 11D2 contact the projection 85B3 (FIG. 7) and the second wall 872, respectively.

Under this condition, as illustrated in FIG. 14, the distance D1 between the ends of the first and second right lower rectifying plates 11D1 and 11D2 becomes shorter than the distance D2 between the other ends of the first and second right lower rectifying plates 11D1 and 11D2 similarly to the condition in the ceiling mounted position.

Accordingly, the first walls 861 and 871, the second walls 862 and 872, and the projections 85A2 and 85A3, 85B2, and 85B3 constitute rotation regulating units 89 (FIGS. 7, 9, and 12 through 14) corresponding to rotation regulating units according to the invention.

As illustrated in FIG. 14, the air having passed along the second channel R2 is rectified by the right lower rectifying member 11D during entrance into the first space Ar1 via the communicating port 88D, and supplied toward the top of the upper part of the light emission portion 511 similarly to the condition in the normal position.

According to the first embodiment, the following advantages can be offered.

In the first embodiment, the second column-shaped portion 82 has the pair of the communicating ports 88U and 88D on the virtual line V as viewed from the +X axis side (front side in the light emission direction).

According to this structure, either one of the pair of the communicating ports 88U and 88D is positioned diagonally above the center line Ax as viewed from a direction along the center line Ax in each condition of the installation positions of the projector 1 (normal position, ceiling mounted position, upward projection position, and downward projection position).

In this case, air can flow toward either the communicating port 88U or the communicating port 88D positioned diagonally above the center line Ax via the first channel R1 or the second channel R2 by the function of the channel switching mechanism 10 to reach the upper part of the light emission portion 511 via the corresponding communicating port 88U or 88D.

Accordingly, supply of air toward the upper part of the light emission portion 511 can be securely achieved in each of the installation positions of the projector 1, wherefore the life of the arc tube 51 increases.

The second column-shaped portion 82 has only the two communicating ports 88 positioned as explained above. In this case, the second column-shaped portion 82 has a larger area which can be opened as the air outlet ports 84D1 and 84L1 in this embodiment than in the structure of the related art.

Thus, air heated by the light emission portion 511 and the like can be efficiently discharged from the first space Ar1 to the outside via the air outlet ports 84D1 and 84L1 having larger opening areas, wherefore the life of the arc tube 51 increases by reduction of heated air remaining in the first space Ar1.

There are provided the rectifying members 11 for each of the communicating ports 88 of the second column-shaped portion 82.

According to this structure, the air introduced into the first space Ar1 via the communicating ports 88 can be efficiently supplied toward the upper part of the light emission portion 511 by rectification of the flow of the air with the aid of the rectifying members 11.

The left upper rectifying member 11U has the first and second left upper rectifying plates 11U1 and 11U2. In this case, the pressure loss of the air introduced into the first space Ar1 via the communicating port 88U decreases while the effect of rectification by the function of the left upper rectifying member 11U increases. Therefore, air can be supplied toward the upper part of the light emission portion 511 in a preferable condition by the use of the minimum number of the rectifying plates 11U1 and 11U2. This applies to the right lower rectifying member 11D as well.

The communicating port 88U has the first left upper communicating port 85A1 and the second left upper communicating port 864. The second left upper communicating port 864 is formed in the left upper accommodating portion 86 on the rear side in the light emission direction. In this case, the left upper accommodating portion 86 has not only the function of accommodating the left upper rectifying member 11U such that the member 11U is rotatable by its own weight, but also the function of rectifying the flow of air toward the upper part of the light emission portion 511 together with the left upper rectifying member 11U.

Accordingly, the addition of the rectifying function to the left upper accommodating portion 86 contributes to secure supply of air toward the upper part of the light emission portion 511, and therefore increases the life of the arc tube 51. This applies to the right lower accommodating portion 87.

There are provided the rotation regulating units 89 on the second column-shaped portion 82. In this case, the flow direction of the air rectified by the first left upper rectifying plate 11U1 and the flow direction of the air rectified by the second left upper rectifying plate 11U2 cross each other in the first space Ar1 during supply of air into the first space Ar1 through the first and second left upper communicating ports 85A1 and 864.

Accordingly, the air introduced into the first space Ar1 via the first and second left upper communicating ports 85A1 and 864 can be securely supplied toward the upper part of the light emission portion 511 by rectification of the flow of the air with the aid of the first and second left upper rectifying plates 11U1 and 11U2. This applies to the air rectified by the first and second right lower rectifying plates 11D1 and 11D2.

A pair of ducts according to the invention are defined by the cover member 9. In this case, the first and second channels R1 and R2 can be produced only by attachment of the cover member 9 to the outer surface of the column-shaped member 8. Accordingly, simplification of the structure of the light source device 4 and size reduction of the light source device 4 can be both achieved.

The respective communicating ports 88U and 88D are located at the positions explained above. In this case, the lengths of the first and second channels R1 and R2 become substantially equal to each other. Accordingly, the amount and the speed of the air supplied toward the upper part of the light emission portion 511 become substantially uniform in each of the installation positions of the projector 1.

Second Embodiment

A second embodiment according to the invention is now explained with reference to the drawings.

The structures and parts in this embodiment similar to the corresponding structures and parts in the first embodiment have been given similar reference numbers, and the detailed explanation of those structures and parts is not repeated or only briefly noted.

Figure 15:
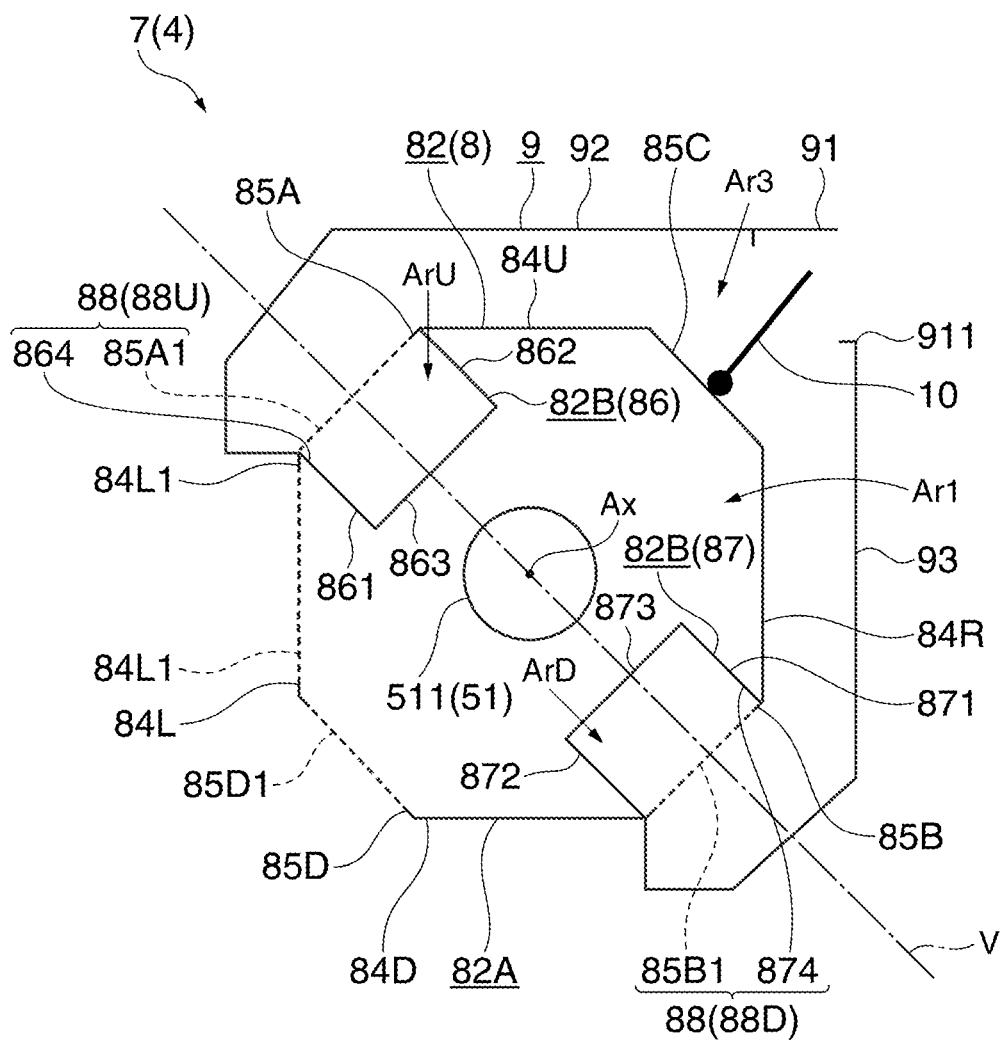
FIG. 15 schematically illustrates the interior of a support member according to a second embodiment.

FIG. 15 schematically illustrates the interior of the support member 7 according to the second embodiment. More specifically, FIG. 15 is a figure corresponding to FIG. 5.

As illustrated in FIG. 15, this embodiment is different from the first embodiment in the following points: 1) the rectifying members 11 are eliminated; 2) the air outlet port 84D1 is eliminated; and 3) a different air outlet port 85D1 is added. Other structures are similar to the corresponding structures in the first embodiment.

More specifically, the two accommodating portions 82B in this embodiment which are hollow areas similarly to the first embodiment do not have the function of accommodating the rectifying members 11 but have only the function of rectifying the flow of air toward the upper portion of the light emission portion 511.

Therefore, the two accommodating portions 82B in this embodiment correspond to hollow portions according to the invention.

As illustrated in FIG. 15, the air outlet port 85D1 is formed in the left lower crossing wall 85D as a port through which the air within the first space Ar1 is discharged similarly to the air outlet port 84D1 discussed in the first embodiment.

FIGS. 16 through 19 illustrate the routes of air in the respective installation positions of the projector 1. More specifically, FIGS. 16 through 19 are figures corresponding to FIGS. 9 and 12 through 14, respectively.

This embodiment is different from the first embodiment only in the points discussed above. Therefore, as illustrated in FIGS. 16 through 19, the routes of air in the respective installation positions of the projector 1 are substantially similar to the corresponding routes in the first embodiment.

Figure 16:
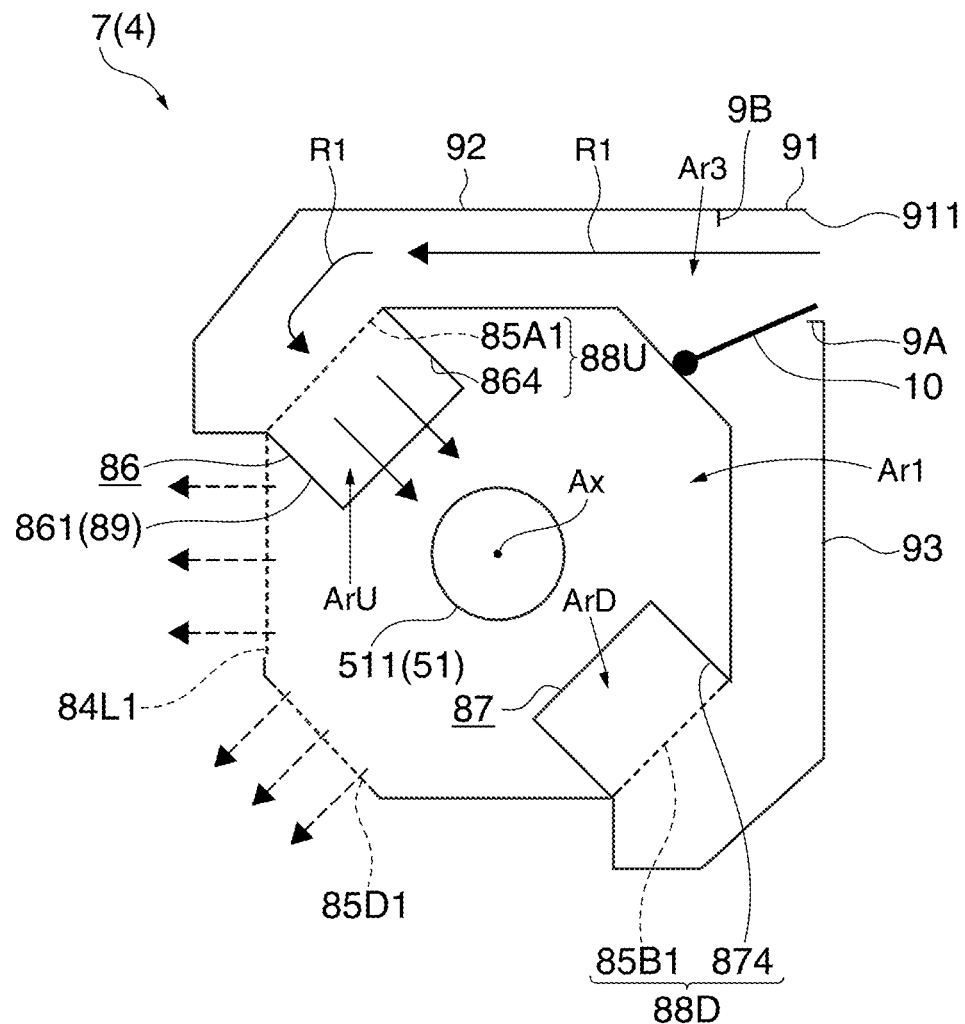
FIG. 16 illustrates a flow route in a normal position according to the second embodiment.
Figure 16:
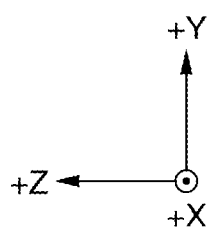

For example, under the normal position, the air flowing along the first route R1 passes through the first left upper communicating port 85A1, the second space ArU, and the second left upper communicating port 864, and enters the first space Ar1 without rectification by the left upper rectifying member 11U as illustrated in FIG. 16.

Then, the air introduced into the first space Ar1 is supplied toward the top of the upper part of the light emission portion 511 to cool the upper part of the light emission portion 511.

After cooling, the air inside the first space Ar1 is discharged to the outside of the light source device 4 via the air outlet ports 84L1 and 85D1 formed in the left side wall 84L and the left lower crossing wall 85D disposed adjacent to each other.

Figure 17:
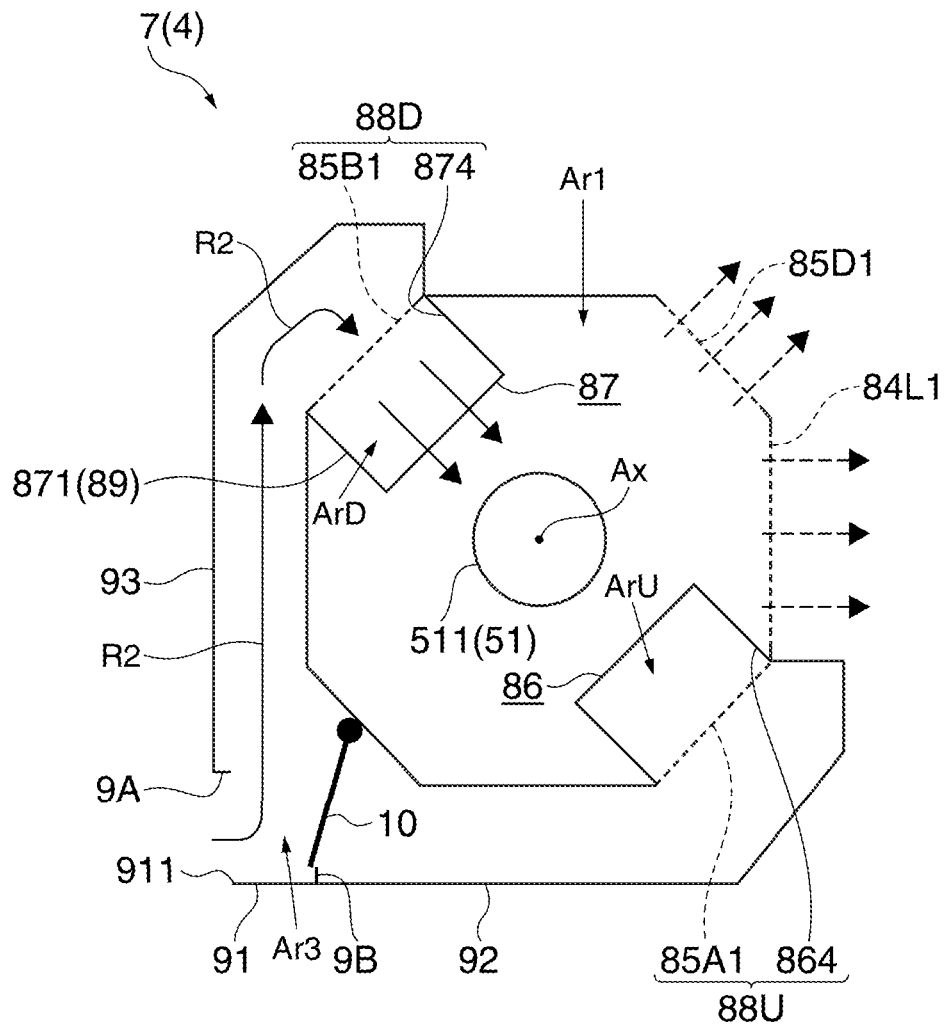
FIG. 17 illustrates a flow route in a ceiling mounted position according to the second embodiment.
Figure 18:
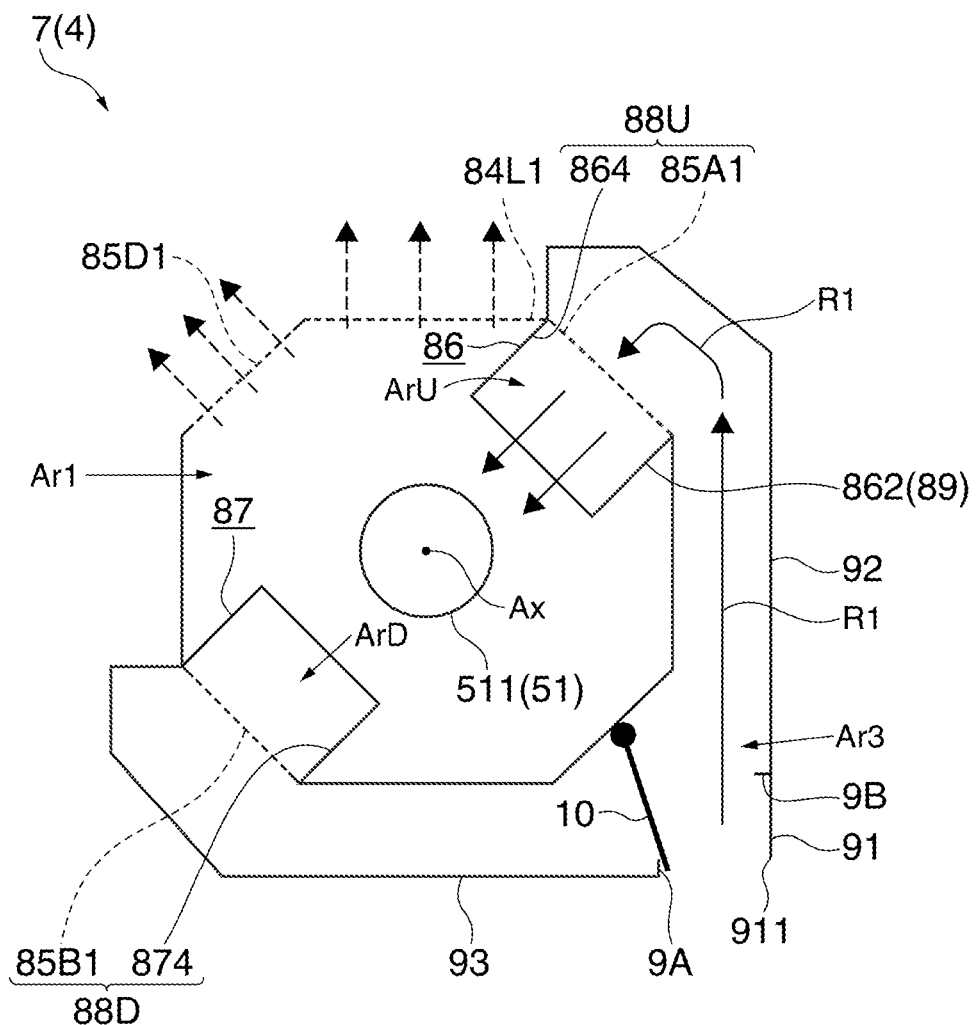
FIG. 18 illustrates a flow route in an upward projection position according to the second embodiment.
Figure 19:
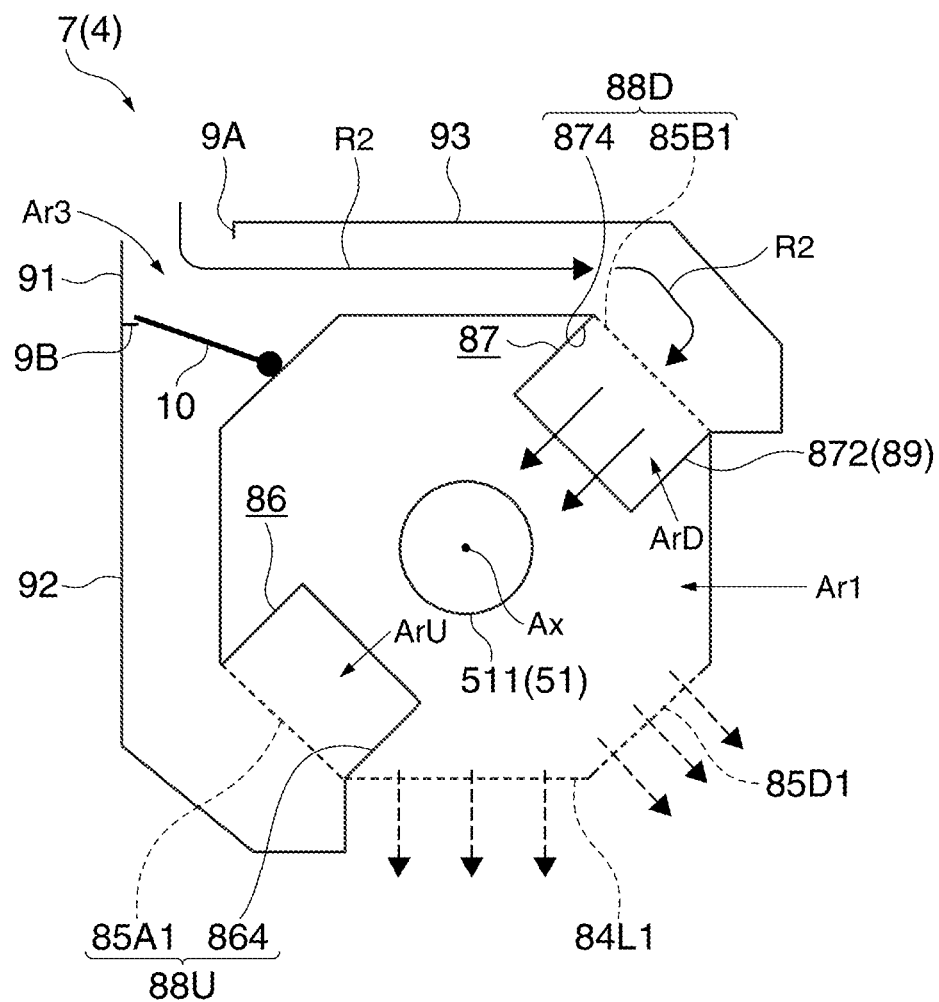
FIG. 19 illustrates a flow route in a downward projection position according to the second embodiment.

The supply of air is similarly achieved in each of the ceiling mounted position, the upper projection position, and the lower projection position (FIGS. 17 through 19).

According to the second embodiment, the following advantages can be offered as well as the advantages of the first embodiment.

In the second embodiment, each of the accommodating portions 82B has the rectifying function. Thus, the flow of air can be rectified toward the top of the upper part of the light emission portion 511 even without the aid of the rectifying members 11.

In addition, the elimination of the rectifying member 11 can further decrease pressure loss of the air within the accommodating portions 82B. Thus, a desired amount of air can be supplied toward the upper part of the light emission portion 511 at a desired flow speed.

Accordingly, effective cooling of the upper part of the light emission portion 511 and simplification of the structure of the light source device 4 can be both achieved.

Furthermore, the air outlet ports 84L1 and 85D1 are formed in the left side wall 84L and the left lower crossing wall 85D disposed adjacent to each other. In this case, the discharge directions of the air to be discharged through the air outlet ports 84L1 and 85D1 can be made substantially the same direction while sufficient areas of the air outlet ports 84L1 and 85D1 are kept opened.

Therefore, such a structure which can collectively discharge the air coming through the air outlet ports 84L1 and 85D1 to the outside of the projector 1 (external housing 2) can be easily realized.

The invention is not limited to the embodiments described and depicted herein, but may be practiced otherwise without departing from the scope of the invention. Thus, modifications, improvements and the like including the following changes may be made.

While only the four installation positions of the projector 1, i.e., the normal position, the ceiling mounted position, the upward projection position, and the downward projection position have been discussed for simplifying the explanation, the position of the projector 1 may be arbitrarily determined in any direction in accordance with rotation of the projector 1 through 360 degrees around the center line Ax.

The positions of the communicating ports 88U and 88D are not limited to the positions specified in the respective embodiments but may be any positions as long as they are located on a virtual line passing through the center line Ax and crossing the vertical direction and the horizontal direction as viewed in a direction along the center line Ax.

While the projector 1 which has the three liquid crystal panels 35 has been discussed in the respective embodiments, the invention is applicable to a projector which has two or a smaller number, or four or a larger number of liquid crystal panels.

The light modulation devices constituted by the transmission type liquid crystal panels in the respective embodiments may be reflection type liquid crystal panels. Alternatively, the light modulation devices may be other types of devices having different structures as long as they can modulate light according to image information. For example, the invention is applicable to a projector which includes a light modulation device other than a liquid crystal type such as a device containing micromirrors. When this type of light modulation device is used, the polarization plates 34 and 36 on the light entrance side and light exit side can be eliminated.

While only the front projection type projector has been discussed in the respective embodiments, the invention is applicable to a rear type projector which has a screen and projects images from the rear surface side of the screen.

The technology of the invention can be incorporated in a projector used for presentation, home theater, and for other purposes.

What is claimed is:

1. A light source device comprising:
    an arc tube which has a light emission portion including a pair of electrodes internally;
    a reflection mirror configured to reflect light emitted from the light emission portion;
    a tubular body disposed in the front side of the reflection mirror in the light emission direction and surrounding the arc tube;
    a pair of ducts connecting with the tubular body and provided with a first channel and a second channel to guide air; and
    a channel switching mechanism which allows air to flow through the first channel or the second channel,
    wherein the light source device is installable in various positions, including a normal position, a ceiling mounted position, an upward projection position, and a downward projection position,
    wherein the tubular body includes a pair of communicating ports which connect the inside and the outside of the tubular body such that the inside and the outside of the tubular body communicate with each other, and supply airs flowing through the first channel and the second channel toward the light emission portion, and
    the pair of the communicating ports are disposed on a virtual line passing through the center line of the arc tube and crossing the vertical direction and the horizontal direction, and either one of the pair of communicating ports is positioned diagonally above the center line in each condition of the various positions, as viewed in a direction along the center line.

2. The light source device according to claim 1,
    wherein the tubular body includes a column-shaped main body, and hollow portions disposed within the column-shaped main body for each of the communicating ports;
    the communicating port includes a first communicating port formed in the column-shaped main body and connecting the outside of the tubular body and the inside of the hollow portion such that the outside of the tubular body and the inside of the hollow portion communicate with each other, and a second communicating port formed in the hollow portion and to flow an air within the hollow portion toward the light emission portion; and
    the second communicating port is formed in a side wall of the hollow portion on the rear side in the light emission direction.

3. The light source device according to claim 2,
    wherein the pair of the ducts is defined by a cover member attached to the outer surface of the tubular body and extended in the circumferential direction of the tubelar body, the cover member forms the first channel and the second channel in the space between the cover member and the outer surface of the tubular body.

4. The light source device according to claim 1,
    wherein rectifying members provided for each of the communicating ports in such a manner as to be rotatable by the weights of the rectifying members rectify the flow of air introduced into the tubular body via the communicating ports toward the light emission portion; and
    each of the two rectifying members has a pair of a first rectifying plate and a second rectifying plate.

5. The light source device according to claim 4,
    wherein the tubular body includes a column-shaped main body, and accommodating portions provided within the column-shaped main body for each of the communicating ports, each of the accommodating portions accommodating the corresponding rectifying member such that the rectifying member is rotatable by the weight of the rectifying member;
    each of the communicating ports includes a first communicating port formed in the column-shaped main body and connecting the outside of the tubular body and the inside of the accommodating portion such that the outside of the tubular body and the inside of the accommodating portion communicate with each other, and a second communicating port formed in the accommodating portion and to flow an air within the accommodating portion toward the light emission portion; and
    the second communicating port is formed in a side wall of the accommodating portion on the rear side in the light emission direction.

6. The light source device according to claim 5,
    wherein the first rectifying plate and the second rectifying plate are pivotally supported on the corresponding accommodating portion such that the ends of the first rectifying plate and the second rectifying plate on the side away from the first communicating port are rotatable around corresponding rotation axis extending in parallel with the center line;
    the tubular body includes rotation regulating unit configured to regulate the rotation of the first rectifying plate and the second rectifying plate; and
    the rotation regulating unit regulates the rotations of the corresponding first and second rectifying plates such that the distance between the ends of the first and second rectifying plates on the side away from the corresponding first communicating port becomes shorter than the distance between the other ends of the first and second rectifying plates on the side nearer to the first communicating port when the first and second rectifying plates are located above the center line.

7. The light source device according to claim 1,
    wherein the pair of the ducts is defined by a cover member attached to the outer surface of the tubular body and extended in the circumferential direction of the tubelar body, the cover member forms the first channel and the second channel in the space between the cover member and the outer surface of the tubular body.

8. A projector comprising:

a light source device;

a light modulation device configured to modulate light emitted from the light source device; and a projection device configured to project the light modulated by the light modulation device, wherein the light source device includes an arc tube which has a light emission portion including a pair of electrodes, a reflection mirror configured to reflect light emitted from the light emission portion, a tubular body disposed in the front side of the reflection minor in the light emission direction and surrounding the arc tube, a pair of ducts connecting with the tubular body and provided with a first channel and a second channel to guide air, and a channel switching mechanism which allows air to flow through the first channel or the second channel, wherein the projector is installable in various positions, including a normal position, a ceiling mounted position, an upward projection position, and a downward projection position, wherein the tubular body includes a pair of communicating ports which connect the inside and the outside of the tubelar body such that the inside and the outside of the tubular body communicate with each other, and supply airs flowing through the first channel and the second channel toward the light emission portion, and the pair of the communicating ports are disposed on a virtual line passing through the center line of the arc tube and crossing the vertical direction and the horizontal direction, and either one of the pair of the communicating ports is positioned diagonally above the center line in each condition of the various positions, as viewed in a direction along the center line.

9. The projector according to claim 8, wherein the tubelar body includes a column-shaped main body, and hollow portions disposed within the column-shaped main body for each of the communicating ports;

the communicating port includes a first communicating port formed in the column-shaped main body and connecting the outside of the tubelar body and the inside of the hollow portion such that the outside of the tubelar body and the inside of the hollow portion communicate with each other, and a second communicating port formed in the hollow portion and to flow an air within the hollow portion toward the light emission portion; and the second communicating port is formed in a side wall of the hollow portion on the rear side in the light emission direction.

10. The projector according to claim 9, wherein the pair of the ducts is defined by a cover member attached to the outer surface of the tubelar body and extended in the circumferential direction of the tubelar body, the cover member forms the first channel and the second channel in the space between the cover member and the outer surface of the tubelar body.

11. The projector according to claim 8, wherein rectifying members provided for each of the communicating ports in such a manner as to be rotatable by the weights of the rectifying members rectify the flow of air introduced into the tubelar body via the communicating ports toward the light emission portion; and each of the two rectifying members has a pair of a first rectifying plate and a second rectifying plate.

12. The projector according to claim 11, wherein the tubelar body includes a column-shaped main body, and accommodating portions provided within the column-shaped main body for each of the communicating ports, each of the accommodating portions accommodating the corresponding rectifying member such that the rectifying member is rotatable by the weight of the rectifying member;

the communicating port includes a first communicating port formed in the column-shaped main body and connecting the outside of the tubelar body and the inside of the accommodating portion such that the outside of the tubelar body and the inside of the accommodating portion communicate with each other, and a second communicating port formed in the accommodating portion and to flow an air within the accommodating portion toward the light emission portion; and the second communicating port is formed in a side wall of the accommodating portion on the rear side in the light emission direction.

13. The projector according to claim 12, wherein the first rectifying plate and the second rectifying plate are pivotally supported on the corresponding accommodating portion such that the ends of the first rectifying plate and the second rectifying plate on the side away from the first communicating port are rotatable around corresponding rotation axis extending in parallel with the center line;

the tubelar body has rotation regulating unit configured to regulate the rotation of the first rectifying plate and the second rectifying plate; and the rotation regulating unit regulates the rotation of the corresponding first and second rectifying plates such that the distance between the ends of the first and second rectifying plates on the side away from the corresponding first communicating port becomes shorter than the distance between the other ends of the first and second rectifying plates on the side nearer to the first communicating port when the first and second rectifying plates are located above the center line.

14. The projector according to claim 8, wherein the pair of the ducts is defined by a cover member attached to the outer surface of the tubelar body and extended in the circumferential direction of the tubelar body, the cover member forms the first channel and the second channel in the space between the cover member and the outer surface of the tubelar body.

* * * * *